United States Patent
Chen et al.

(10) Patent No.: US 10,829,583 B2
(45) Date of Patent: Nov. 10, 2020

(54) RADIATION CURABLE POLYURETHANE-BASED BINDER DISPERSION

(71) Applicant: Hewlett-Packard Development Company, L.P., Houston, TX (US)

(72) Inventors: Tienteh Chen, San Diego, CA (US); Bin Huang, Escondido, CA (US); Benjamin Abelovski, Escondido, CA (US); George Sarkisian, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 50 days.

(21) Appl. No.: 15/737,744

(22) PCT Filed: Oct. 28, 2015

(86) PCT No.: PCT/US2015/057800
§ 371 (c)(1),
(2) Date: Dec. 18, 2017

(87) PCT Pub. No.: WO2017/074349
PCT Pub. Date: May 4, 2017

(65) Prior Publication Data
US 2018/0179325 A1    Jun. 28, 2018

(51) Int. Cl.
| | | |
|---|---|---|
| C08G 18/34 | (2006.01) | |
| C08G 18/62 | (2006.01) | |
| C09D 11/30 | (2014.01) | |
| C09D 11/101 | (2014.01) | |
| C09D 11/54 | (2014.01) | |
| C08G 18/48 | (2006.01) | |
| C08G 18/10 | (2006.01) | |
| C08G 18/73 | (2006.01) | |
| C08G 18/65 | (2006.01) | |
| C08G 18/67 | (2006.01) | |
| C08F 290/06 | (2006.01) | |
| C09D 175/16 | (2006.01) | |
| C08G 18/75 | (2006.01) | |
| C09D 175/14 | (2006.01) | |
| C08G 18/08 | (2006.01) | |
| C08G 18/28 | (2006.01) | |
| C08G 18/24 | (2006.01) | |
| C08G 18/66 | (2006.01) | |
| C08G 18/32 | (2006.01) | |
| C08L 75/00 | (2006.01) | |
| C09D 11/102 | (2014.01) | |
| B41M 5/00 | (2006.01) | |

(52) U.S. Cl.
CPC ...... *C08G 18/6225* (2013.01); *C08F 290/067* (2013.01); *C08G 18/0823* (2013.01); *C08G 18/0828* (2013.01); *C08G 18/0866* (2013.01); *C08G 18/10* (2013.01); *C08G 18/246* (2013.01); *C08G 18/288* (2013.01); *C08G 18/3215* (2013.01); *C08G 18/348* (2013.01); *C08G 18/4833* (2013.01); *C08G 18/6541* (2013.01); *C08G 18/6692* (2013.01); *C08G 18/672* (2013.01); *C08G 18/673* (2013.01); *C08G 18/675* (2013.01); *C08G 18/73* (2013.01); *C08G 18/755* (2013.01); *C08G 18/758* (2013.01); *C08L 75/00* (2013.01); *C09D 11/101* (2013.01); *C09D 11/102* (2013.01); *C09D 11/30* (2013.01); *C09D 11/54* (2013.01); *C09D 175/14* (2013.01); *C09D 175/16* (2013.01); *B41M 5/0017* (2013.01); *C08L 2201/54* (2013.01); *C08L 2203/16* (2013.01)

(58) Field of Classification Search
CPC ............ C08G 18/2865; C08G 18/0823; C08G 18/0828; C08G 18/0866; C08G 18/34; C08L 2201/54; C08L 75/00
See application file for complete search history.

(56) References Cited

U.S. PATENT DOCUMENTS

| | | | |
|---|---|---|---|
| 4,110,284 A | 8/1978 | Violland et al. | |
| 5,277,945 A | 1/1994 | Takoh et al. | |
| (Continued) | | | |

FOREIGN PATENT DOCUMENTS

| | | |
|---|---|---|
| CN | 101421368 | 4/2009 |
| CN | 102884144 | 1/2013 |
| (Continued) | | |

OTHER PUBLICATIONS

International Search Report and Written Opinion for International Application No. PCT/US2015/057800 dated Aug. 8, 2016, 10 pages.

*Primary Examiner* — Monique R Peets
(74) *Attorney, Agent, or Firm* — Dierker & Kavanaugh PC

(57) ABSTRACT

A radiation curable polyurethane-based binder dispersion includes water and a radiation curable polyurethane dispersed in the water. The polyurethane is formed from: a polyisocyanate; a polyol having a chain with two hydroxyl functional groups at one end of the chain and no hydroxyl groups at an opposed end of the chain, and having a number average molecular weight ranging from about 500 to about 5,000; an acrylate or methacrylate, the acrylate or methacrylate having at least one hydroxyl functional group and having an acrylate functional group or a methacrylate functional group; an alcohol or a diol or an amine having a number average molecular weight less than 600; and a sulfonate or sulfonic acid having one or two amino functional groups.

18 Claims, No Drawings

(56) References Cited

U.S. PATENT DOCUMENTS

| | | |
|---|---|---|
| 5,384,362 A | 1/1995 | Carlson et al. |
| 5,548,005 A | 8/1996 | Kurth et al. |
| 6,136,890 A | 10/2000 | Carlson et al. |
| 6,455,611 B1 | 9/2002 | Pears et al. |
| 7,858,676 B2 | 12/2010 | Waki et al. |
| 8,348,411 B2 | 1/2013 | Brust et al. |
| 8,492,456 B2 | 7/2013 | Chen et al. |
| 8,513,334 B2 | 8/2013 | Grablowitz et al. |
| 8,557,387 B2 | 10/2013 | Kraus et al. |
| 8,679,243 B2 | 3/2014 | Yokoyama et al. |
| 2008/0058456 A1* | 3/2008 | Chiou ............... C08F 2/22 524/457 |
| 2008/0145563 A1 | 6/2008 | Heischkel et al. |
| 2009/0270581 A1* | 10/2009 | Tielemans ......... C08G 18/0823 528/59 |
| 2011/0303113 A1 | 12/2011 | Sarkisian et al. |
| 2011/0306724 A1 | 12/2011 | Campbell et al. |
| 2012/0041145 A1* | 2/2012 | Sommer ............... C08F 283/01 524/839 |
| 2013/0085217 A1 | 4/2013 | Iu et al. |
| 2013/0102729 A1 | 4/2013 | Li et al. |
| 2014/0288237 A1 | 9/2014 | Berge et al. |

FOREIGN PATENT DOCUMENTS

| | | |
|---|---|---|
| CN | 103254867 | 8/2013 |
| CN | 103626953 | 3/2014 |
| CN | 103709363 | 4/2014 |
| EP | 1382622 | 9/2002 |
| EP | 2559740 | 2/2013 |
| JP | 5594451 | 9/2014 |
| WO | WO 01/74921 | 10/2001 |
| WO | WO 2011/063190 | 5/2011 |
| WO | WO 2012/088122 | 6/2012 |
| WO | WO 2013/037767 | 3/2013 |
| WO | WO 2013/067222 | 5/2013 |
| WO | WO 2013/096344 | 6/2013 |
| WO | WO 2013/165946 | 11/2013 |
| WO | WO 2015/028397 | 3/2015 |
| WO | WO-2015116029 | 8/2015 |
| WO | WO-2016122563 | 8/2016 |

* cited by examiner

RADIATION CURABLE POLYURETHANE-BASED BINDER DISPERSION

BACKGROUND

In addition to home and office usage, inkjet technology has been expanded to high-speed, commercial and industrial printing. Inkjet printing is a non-impact printing method that utilizes electronic signals to control and direct droplets or a stream of ink to be deposited on media. Some commercial and industrial inkjet printers utilize fixed printheads and a moving substrate web in order to achieve high speed printing. Current inkjet printing technology involves forcing the ink drops through small nozzles by thermal ejection, piezoelectric pressure or oscillation onto the surface of the media. This technology has become a popular way of recording images on various media surfaces (e.g., paper), for a number of reasons, including, low printer noise, capability of high-speed recording and multi-color recording.

DETAILED DESCRIPTION

In inkjet printing, polyurethane dispersions may be added to inkjet inks to improve the durability of the resulting print. In particular, polyurethanes have been added to improve the scratch and abrasion resistance of the resulting prints. However, it has been found that the amount and type of polyurethane used in the inkjet inks may lead to complications with the jetting performance and reliability (e.g., issues with nozzle health, poor decap, low drop weight, and decreased drop velocity). In addition, the presence of polyurethane can deleteriously affect the image quality (e.g., gloss and optical density). For example, polyurethane may undesirably coagulate when applied to a pre-treatment fixing fluid as a result of a reaction between the polyurethane and component(s) in the pre-treatment fixing fluid.

Many inks including more than 5% of a prior polyurethane binder exhibit poor decap performance. The term "decap performance," as referred to herein, means the ability of the inkjet ink to readily eject from the printhead, upon prolonged exposure to air. The decap time is measured as the amount of time that a printhead may be left uncapped (i.e., exposed to air) before the printer nozzles no longer fire properly, potentially because of clogging, plugging, or retraction of the colorant from the drop forming region of the nozzle/firing chamber. The length of time a thermal inkjet pen can remain unused and uncapped before spitting would be required to form an acceptable quality ink drop is called decap time, or first drop decap time. Another decap metric is the number of spits required to get the pen healthy at a specific time interval. A decreased decap time can lead to poor print reliability. As such, the longest decap time that would give acceptable first drop quality or the fewest number of spits required at any given decap time would be desirable for any given ink.

Examples of the inkjet ink disclosed herein, which include the radiation curable polyurethane binder dispersion disclosed herein, exhibit several desirable characteristics, some of which are improved image quality and improved decap performance. In particular, when the inkjet ink is printed at intervals with idle and uncapped periods between printing intervals, the number of spits (drops) required to obtain a healthy (i.e., drop weight and location) normal drop on a medium is reduced, e.g., when compared to inks including other types of polyurethane dispersions.

The improved image quality and improved decap performance are believed to be due, at least in part, to a combination of the particular polyol and a sulfonate or sulfonic acid having one or two amino functional groups used to form the polyurethane binder. The polyol includes two hydroxyl groups at one end of the polymer chain and no hydroxyl groups at the opposed end of the polymer chain. In some examples, this polyol replaces the type of polyol used in typical polyurethanes, which has hydroxyl groups at both ends of the polymer chain. A portion of the polyol disclosed herein becomes pendant to the polyurethane backbone and the polyurethane has a comb like structure after polymerization. The hydroxyl groups may become part of the polyurethane backbone and the remaining portion of the polyol (i.e., the group at the other end of the polyol) becomes the pendant group or pendant branch. This is in contrast to the replaced polyol, which generally incorporates the entire polyol into the backbone of the polymer chain without any portion of the polyol forming a pendant group or pendant chain. In the examples disclosed herein, it has been found that the improved decap performance and improved image quality are obtained, even at high binder loadings, when at least this polyol (including two hydroxyl groups at one end of the polymer chain and no hydroxyl groups at the opposed end of the polymer chain) and a sulfonate or sulfonic acid having one or two amino functional groups are used.

The image quality such as gloss and optical density may further be improved if the radiation curable polyurethane dispersions contain the sulfonate functional group, alone or in combination with poly(ethyleneglycol), in the backbone or at the chain end of the polyurethane forming the polyurethane dispersions.

The improved decap performance may also be due to the relatively small size of the radiation curable polyurethane binder. For example, the polyurethane binder may be in the form of particles having an average particle size ranging from about 10 nm to about 100 nm in radius. These small particles can be easily jetted, and thus do not deleteriously affect the nozzle health. Still further, the improved decap performance may be due, at least in part, to other properties of the polyurethane binder dispersion, including the acid number (e.g., the sum of both weak and strong acid groups, with a unit of mg KOH per 1 gram of polymer). These properties may also contribute to the inkjet ink having dispersion stability and the ability to form durable prints. Overall, the inkjet inks including examples of the radiation curable polyurethane binder dispersion disclosed herein exhibit improved jetting performance and print reliability.

Moreover, improved image quality may result when the inkjet ink (including an example of the radiation curable polyurethane binder dispersion) is coupled with a pre-treatment fixer fluid.

The inkjet ink, which includes an example of the radiation curable polyurethane binder disclosed herein, may be included in a single cartridge ink set or a multiple-cartridge ink set (which may or may not include the pre-treatment fixer fluid). In the multiple-cartridge ink set, any number of the multiple inks may have the example polyurethane binder incorporated therein.

In an example, the inkjet ink disclosed herein includes a co-solvent (in addition to any water that is present), a colorant, a surfactant, a photoinitiator, an example of the radiation curable polyurethane binder, and a balance of water (which is the main solvent). In some examples, the inkjet ink composition consists of these components, with no other components. As one example, the inkjet ink may exclude polymers other than the radiation curable polyurethane binder disclosed herein. In other examples, the inkjet ink composition may include other components, such as a jettability additive, and an anti-kogation agent.

As used herein, "ink vehicle" may refer to the liquid fluid in which the radiation curable polyurethane binder (e.g., the radiation curable polyurethane binder dispersion) and the colorant (e.g., a colorant dispersion) are placed to form the ink(s). A wide variety of ink vehicles may be used in the inkjet ink. The ink vehicle may include water alone or in combination with a mixture of a variety of additional components. Examples of these additional components may include the co-solvent(s), the surfactant(s), the anti-kogation agent(s), the photoinitiator(s), and/or the jettability additive(s).

The co-solvent(s) may be present in the inkjet ink in an amount ranging from about 0.1 wt % to about 30 wt %, depending, at least in part, on the jetting architecture to be used. In an example, the co-solvent is present in the inkjet ink in an amount of about 10 wt % based on the total wt % of the inkjet ink. It is to be understood that other amounts outside of this example and range may also be used. Classes of co-solvents that may be used include organic co-solvents, such as aliphatic alcohols, aromatic alcohols, diols, glycol ethers, polyglycol ethers, 2-pyrrolidinones, caprolactams, formamides, acetamides, glycols, and long chain alcohols. Examples of these co-solvents include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. In some examples, the ink vehicle may include 1-(2-hydroxyethyl)-2-pyrrolidone.

As mentioned above, the ink vehicle of the inkjet ink may also include surfactant(s). As an example, the inkjet ink may include non-ionic, cationic, and/or anionic surfactants, which may be present in an amount ranging from about 0.01 wt % to about 5 wt % based on the total wt % of the inkjet ink. In at least some examples, the ink vehicle may include a silicone-free alkoxylated alcohol surfactant such as, for example, TECO® Wet 510 (Evonik Tego Chemie GmbH) and/or a self-emulsifiable wetting agent based on acetylenic diol chemistry, such as, for example, SURFYNOL® SE-F (Air Products and Chemicals, Inc.). Other suitable commercially available surfactants include SURFYNOL® 465 (ethoxylated acetylenic diol), CARBOWET® GA-211 (a.k.a. SURFYNOL® CT-211, non-ionic, alkylphenylethoxylate and solvent free), and SURFYNOL® 104 (non-ionic wetting agent based on acetylenic diol chemistry), (all of which are from Air Products and Chemicals, Inc.); ZONYL® FSO (a.k.a. CAPSTONE®, which is a water-soluble, ethoxylated non-ionic fluorosurfactant from Dupont); TERGITOL® TMN-3 and TERGITOL® TMN-6 (both of which are branched secondary alcohol ethoxylate, non-ionic surfactants), and TERGITOL® 15-S-3, TERGITOL® 15-S-5, and TERGITOL® 15-S-7 (each of which is a secondary alcohol ethoxylate, non-ionic surfactant) (all of the TERGITOL® surfactants are available from The Dow Chemical Co.).

The ink vehicle of the inkjet ink may include the anti-kogation agent. Kogation refers to the deposit of dried ink on a heating element of a thermal inkjet printhead. Anti-kogation agent(s) is/are included to assist in preventing the buildup of kogation. Examples of suitable anti-kogation agents include oleth-3-phosphate (commercially available as CRODAFOS® O3A or CRODAFOS® N-3 acid from Croda Int.) or dextran 500k. Other suitable examples of the anti-kogation agents include CRODAFOS® HCE (phosphate-ester from Croda Int.), CRODAFOS® N10 (oleth-10-phosphate from Croda Int.), or DISPERSOGEN® LFH (polymeric dispersing agent with aromatic anchoring groups, acid form, anionic, from Clariant), etc. The anti-kogation agent may be present in the inkjet ink in an amount ranging from about 0.05 wt % to about 2 wt % of the total wt % of the ink.

The inkjet ink may also include a photoinitiator. The photoinitiator initiates the polymerization and/or crosslinking of the radiation curable polyurethane upon exposure to a suitable stimulus (e.g., electromagnetic radiation). Some examples of the photoinitiator include 1-[4-(2-Hydroxyethoxy)-phenyl]-2-hydroxy-2-methyl-1-propane-1-one (which is commercially available from BASF Corp. as IRGACURE® 2959); acyl phosphine oxide photoinitiators (e.g., IRGACURE® 819, commercially available from BASF Corp.); alpha hydroxy ketone photoinitiators (e.g., IRGACURE® 184, commercially available from BASF Corp.); Iodonium, (4-methylphenyl)[4-(2-methylpropyl)phenyl]-,hexafluorophosphate(1-) (which is commercially available from BASF Corp. as IRGACURE® 250); a high-molecular-weight sulfonium salt (e.g., IRGACURE® 270, commercially available from BASF Corp.); 2-Benzyl-2-dimethylamino-1-(4-morpholinophenyl)-butanone-1 (which is commercially available from BASF Corp. as IRGACURE® 369); alpha amino ketone photoinitiator (e.g., IRGACURE® 379, commercially available from BASF Corp.); a liquid blend of alpha hydroxy ketone/benzophenone photoinitiator (e.g., IRGACURE® 500, commercially available from BASF Corp.); and a liquid photoinitiator blend of acyl phosphine oxide/alpha hydroxy ketone (e.g., IRGACURE® 2022, commercially available from BASF Corp.). Some other suitable photoinitiators include phosphine oxide derivatives, thioxanthone derivatives, and benzophenone derivatives. The photoinitiator is present in the inkjet ink in an amount ranging from about 0.1 wt % to about 1.0 wt % of the total wt % of the ink. In another example, the photoinitiator is present in the inkjet ink in an amount ranging from about 0.2 wt % to about 0.6 wt % of the total wt % of the ink.

It is to be understood that a co-photoinitiator/sensitizer may also be included in the inkjet ink, to accelerate the initiation reaction of the photoinitiator. A suitable sensitizer may be a thioxanthone-based sensitizer. An example of a thioxanthone-based sensitizer includes an ethoxylated thioxanthone (an example of which is thioxanthone modified with JEFFAMINE® M-1000 (a copolymer of poly(ethylene glycol) and poly(propylene glycol) with one amino functional group)). The sensitizer may be present in the inkjet ink in an amount ranging from about 0.1 wt % to about 1.0 wt % of the total wt % of the ink. In another example, the sensitizer is present in the inkjet ink in an amount ranging from about 0.2 wt % to about 0.6 wt % of the total wt % of the ink.

In some examples disclosed herein, the ink vehicle of the inkjet ink may also include antimicrobial agent(s) (biocide(s)), viscosity modifier(s), material(s) for pH adjustment, sequestering agent(s), preservative(s), jettability additive(s) (e.g., liponic ethylene glycol (LEG-1), available from Liponics), and the like.

When a biocide is utilized, a suitable amount of the biocide may range from about 0.05 wt % to about 0.5 wt % of a total wt % of the ink. In examples, the biocide is present at about 0.18 wt %, or at about 0.14 wt % of a total wt % of the ink. It is to be understood that the upper limit for the biocide(s) may depend upon the type of biocide and its toxicological effect and/or regulatory requirements. For example, the upper limit for PROXEL® GXL (Arch Chemicals, Inc., Norwalk, Conn.) is 0.2 wt %. Suitable biocides include, for example, PROXEL® GXL, KORDEK® MLX (The Dow Chemical Co.), and/or BIOBAN® CS-1246 (The Dow Chemical Co.).

The inkjet ink may be any color, such as black, cyan, magenta, yellow, etc. As such, in addition to the ink vehicle, the inkjet ink also includes a colorant. In an example, the colorant is a self-dispersed pigment added to the ink vehicle. In another example, the colorant is a pigment in a dispersion including water, the pigment, and a polymer that disperses the pigment (i.e., the polymer dispersant). In an example, the pigment dispersion may also include, for example, a co-solvent, such as 2-pyrrolidone. The pigment dispersion may be prepared or purchased, and the other components of the ink (e.g., vehicle components and the radiation curable polyurethane binder dispersion) may be slowly added to the pigment dispersion with continuous mixing, to form the inkjet ink.

As used herein, "pigment" may generally include organic or inorganic pigment colorants, magnetic particles, aluminas, silicas, and/or other ceramics, organo-metallics, metallic particulates, or other opaque particles that introduce color to the ink vehicle. The pigment may be any color, including, as examples, a cyan pigment, a magenta pigment, a yellow pigment, a black pigment, a violet pigment, a green pigment, a brown pigment, an orange pigment, a purple pigment, a white pigment, a metallic pigment (e.g., a gold pigment, a bronze pigment, a silver pigment, or a bronze pigment), a pearlescent pigment, or combinations thereof. Any suitable pigment may be used, and while several examples are provided herein, it is to be understood that the list is non-limiting.

Examples of suitable blue or cyan organic pigments include C.I. Pigment Blue 1, C.I. Pigment Blue 2, C.I. Pigment Blue 3, C.I. Pigment Blue 15, Pigment Blue 15:3, C.I. Pigment Blue 15:34, C.I. Pigment Blue 15:4, C.I. Pigment Blue 16, C.I. Pigment Blue 18, C.I. Pigment Blue 22, C.I. Pigment Blue 25, C.I. Pigment Blue 60, C.I. Pigment Blue 65, C.I. Pigment Blue 66, C.I. Vat Blue 4, and C.I. Vat Blue 60.

Examples of suitable magenta, red, or violet organic pigments include C.I. Pigment Red 1, C.I. Pigment Red 2, C.I. Pigment Red 3, C.I. Pigment Red 4, C.I. Pigment Red 5, C.I. Pigment Red 6, C.I. Pigment Red 7, C.I. Pigment Red 8, C.I. Pigment Red 9, C.I. Pigment Red 10, C.I. Pigment Red 11, C.I. Pigment Red 12, C.I. Pigment Red 14, C.I. Pigment Red 15, C.I. Pigment Red 16, C.I. Pigment Red 17, C.I. Pigment Red 18, C.I. Pigment Red 19, C.I. Pigment Red 21, C.I. Pigment Red 22, C.I. Pigment Red 23, C.I. Pigment Red 30, C.I. Pigment Red 31, C.I. Pigment Red 32, C.I. Pigment Red 37, C.I. Pigment Red 38, C.I. Pigment Red 40, C.I. Pigment Red 41, C.I. Pigment Red 42, C.I. Pigment Red 48(Ca), C.I. Pigment Red 48(Mn), C.I. Pigment Red 57(Ca), C.I. Pigment Red 57:1, C.I. Pigment Red 88, C.I. Pigment Red 112, C.I. Pigment Red 114, C.I. Pigment Red 122, C.I. Pigment Red 123, C.I. Pigment Red 144, C.I. Pigment Red 146, C.I. Pigment Red 149, C.I. Pigment Red 150, C.I. Pigment Red 166, C.I. Pigment Red 168, C.I. Pigment Red 170, C.I. Pigment Red 171, C.I. Pigment Red 175, C.I. Pigment Red 176, C.I. Pigment Red 177, C.I. Pigment Red 178, C.I. Pigment Red 179, C.I. Pigment Red 184, C.I. Pigment Red 185, C.I. Pigment Red 187, C.I. Pigment Red 202, C.I. Pigment Red 209, C.I. Pigment Red 219, C.I. Pigment Red 224, C.I. Pigment Red 245, C.I. Pigment Red 286, C.I. Pigment Violet 19, C.I. Pigment Violet 23, C.I. Pigment Violet 32, C.I. Pigment Violet 33, C.I. Pigment Violet 36, C.I. Pigment Violet 38, C.I. Pigment Violet 43, and C.I. Pigment Violet 50.

Examples of suitable yellow organic pigments include C.I. Pigment Yellow 1, C.I. Pigment Yellow 2, C.I. Pigment Yellow 3, C.I. Pigment Yellow 4, C.I. Pigment Yellow 5, C.I. Pigment Yellow 6, C.I. Pigment Yellow 7, C.I. Pigment Yellow 10, C.I. Pigment Yellow 11, C.I. Pigment Yellow 12, C.I. Pigment Yellow 13, C.I. Pigment Yellow 14, C.I. Pigment Yellow 16, C.I. Pigment Yellow 17, C.I. Pigment Yellow 24, C.I. Pigment Yellow 34, C.I. Pigment Yellow 35, C.I. Pigment Yellow 37, C.I. Pigment Yellow 53, C.I. Pigment Yellow 55, C.I. Pigment Yellow 65, C.I. Pigment Yellow 73, C.I. Pigment Yellow 74, C.I. Pigment Yellow 75, C.I. Pigment Yellow 77, C.I. Pigment Yellow 81, C.I. Pigment Yellow 83, C.I. Pigment Yellow 93, C.I. Pigment Yellow 94, C.I. Pigment Yellow 95, C.I. Pigment Yellow 97, C.I. Pigment Yellow 98, C.I. Pigment Yellow 99, C.I. Pigment Yellow 108, C.I. Pigment Yellow 109, C.I. Pigment Yellow 110, C.I. Pigment Yellow 113, C.I. Pigment Yellow 114, C.I. Pigment Yellow 117, C.I. Pigment Yellow 120, C.I. Pigment Yellow 122, C.I. Pigment Yellow 124, C.I. Pigment Yellow 128, C.I. Pigment Yellow 129, C.I. Pigment Yellow 133, C.I. Pigment Yellow 138, C.I. Pigment Yellow 139, C.I. Pigment Yellow 147, C.I. Pigment Yellow 151, C.I. Pigment Yellow 153, C.I. Pigment Yellow 154, C.I. Pigment Yellow 167, C.I. Pigment Yellow 172, C.I. Pigment Yellow 180, and C.I. Pigment Yellow 185.

Carbon black may be a suitable inorganic black pigment. Examples of carbon black pigments include those manufactured by Mitsubishi Chemical Corporation, Japan (such as, e.g., carbon black No. 2300, No. 900, MCF88, No. 33, No. 40, No. 45, No. 52, MA7, MA8, MA100, and No. 2200B); various carbon black pigments of the RAVEN® series manufactured by Columbian Chemicals Company, Marietta, Ga., (such as, e.g., RAVEN® 5750, RAVEN® 5250, RAVEN® 5000, RAVEN® 3500, RAVEN® 1255, and RAVEN® 700); various carbon black pigments of the REGAL® series, the MOGUL® series, or the MONARCH® series manufactured by Cabot Corporation, Boston, Mass., (such as, e.g., REGAL® 400R, REGAL® 330R, REGAL® 660R, MOGUL® E, MOGUL® L, AND ELFTEX® 410); and various black pigments manufactured by Evonik Degussa Orion Corporation, Parsippany, N.J. (such as, e.g., Color Black FW1, Color Black FW2, Color Black FW2V, Color Black FW18, Color Black FW200, Color Black S150, Color Black S160, Color Black S170, PRINTEX® 35, PRINTEX® U, PRINTEX® V, PRINTEX® 140U, Special Black 5, Special Black 4A, and Special Black 4). An example of an organic black pigment includes aniline black, such as C.I. Pigment Black 1.

Some examples of green organic pigments include C.I. Pigment Green 1, C.I. Pigment Green 2, C.I. Pigment Green 4, C.I. Pigment Green 7, C.I. Pigment Green 8, C.I. Pigment Green 10, C.I. Pigment Green 36, and C.I. Pigment Green 45.

Examples of brown organic pigments include C.I. Pigment Brown 1, C.I. Pigment Brown 5, C.I. Pigment Brown 22, C.I. Pigment Brown 23, C.I. Pigment Brown 25, C.I. Pigment Brown 41, and C.I. Pigment Brown 42.

Some examples of orange organic pigments include C.I. Pigment Orange 1, C.I. Pigment Orange 2, C.I. Pigment Orange 5, C.I. Pigment Orange 7, C.I. Pigment Orange 13, C.I. Pigment Orange 15, C.I. Pigment Orange 16, C.I. Pigment Orange 17, C.I. Pigment Orange 19, C.I. Pigment Orange 24, C.I. Pigment Orange 34, C.I. Pigment Orange 36, C.I. Pigment Orange 38, C.I. Pigment Orange 40, C.I. Pigment Orange 43, and C.I. Pigment Orange 66.

A suitable metallic pigment includes a metal chosen from gold, silver, platinum, nickel, chromium, tin, zinc, indium, titanium, copper, aluminum, and alloys of any of these metals. These metals may be used alone or in combination with two or more metals or metal alloys. Some examples of metallic pigments include STANDART® RO100, STANDART® RO200, and DORADO® gold-bronze pigments (available from Eckart Effect Pigments, Wesel, Germany).

The total amount of pigment in the inkjet ink ranges from about 1 wt % to about 5 wt % (based on the total wt % of the inkjet ink). The average particle size of the pigments may range anywhere from about 50 nm to about 200 nm. In an example, the average particle size ranges from about 80 nm to about 150 nm.

In the examples disclosed herein, the pigment may be dispersed by an anionic polymer (i.e., anionic polymeric dispersant). The dispersant may be present in an amount ranging from about 0.1 wt % to about 5 wt % of a total wt % of the ink composition.

In an example, the dispersant may be styrene-acrylic-type dispersants such as acrylic dispersants having i) hydrophilic monomers including acidic monomers, and ii) hydrophobic monomers. The acid number of the dispersant may range from about 120 mg/g to about 300 mg/g. It is to be understood that the styrene-acrylic-type dispersants are water soluble.

Acidic monomers that may be used in the acrylic dispersant may include, for example, acrylic acid, methacrylic acid, ethacrylic acid, dimethylacrylic acid, maleic anhydride, maleic acid, vinylsulfonate, cyanoacrylic acid, vinylacetic acid, allylacetic acid, ethylidineacetic acid, propylidineacetic acid, crotonoic acid, fumaric acid, itaconic acid, sorbic acid, angelic acid, cinnamic acid, styrylacrylic acid, citraconic acid, glutaconic acid, aconitic acid, phenylacrylic acid, acryloxypropionic acid, aconitic acid, phenylacrylic acid, acryloxypropionic acid, vinylbenzoic acid, N-vinyl-succinamidic acid, mesaconic acid, methacroylalanine, acryloylhydroxyglycine, sulfoethyl methacrylic acid, sulfopropyl acrylic acid, styrene sulfonic acid, sulfoethylacrylic acid, 2-methacryloyloxymethane-1-sulfonic acid, 3-methacryoyloxypropane-1-sulfonic acid, 3-(vinyloxy)propane-1-sulfonic acid, ethylenesulfonic acid, vinyl sulfuric acid, 4-vinylphenyl sulfuric acid, ethylene phosphonic acid, vinyl phosphoric acid, vinyl benzoic acid, 2-acrylamido-2-methyl-1-propanesulfonic acid, and combinations thereof.

Examples of the hydrophobic monomers that can be polymerized in the acrylic dispersant may include styrene, p-methyl styrene, methyl methacrylate, hexyl acrylate, hexyl methacrylate, butyl acrylate, butyl methacrylate, ethyl acrylate, ethyl methacrylate, propyl acrylate, propyl methacrylate, octadecyl acrylate, octadecyl methacrylate, stearyl methacrylate, vinylbenzyl chloride, isobornyl acrylate, tetrahydrofurfuryl acrylate, 2-phenoxyethyl methacrylate, ethoxylated nonyl phenol methacrylate, isobornyl methacrylate, cyclohexyl methacrylate, t-butyl methacrylate, n-octyl methacrylate, lauryl methacrylate, tridecyl methacrylate, alkoxylated tetrahydrofurfuryl acrylate, isodecyl acrylate, isobornylmethacrylate, and combinations thereof.

The inkjet ink also includes an example of the radiation curable polyurethane binder (also referred to herein as "radiation curable polyurethane" or "polyurethane"). In an example, the radiation curable polyurethane binder is present in the radiation curable polyurethane binder dispersion with water. The polyurethane binder is present in the ink an amount ranging from greater than 1 wt % to about 20 wt % based upon the total wt % of the inkjet ink. In another example, the amount of polyurethane binder ranges from about 5 wt % to about 20 wt % or from greater than 5 wt % to about 15 wt % based upon the total wt % of the inkjet ink. This weight percentage accounts for the weight percent of active polyurethane binder present in the ink composition, and does not account for the total weight percent of the polyurethane binder dispersion in the inkjet ink. As such, the weight percentages given for the polyurethane binder do not account for any other components (e.g., water) that may be present when the polyurethane is part of the dispersion. The polyurethane binder dispersion may be added with the colorant (e.g., colorant dispersion) and the components of the ink vehicle to form the inkjet ink.

Examples of the radiation curable polyurethane binder dispersion may be formed by synthesizing a polyurethane solution (i.e., the polyurethane polymer in an organic solvent), and then ionizing and dispersing the polyurethane solution in water to form the polyurethane binder dispersion. The resulting polyurethane binder dispersion includes the polyurethane polymer, which is water soluble/dispersible. The synthesis of the radiation curable polyurethane binder dispersion will be discussed further below.

In an example, the radiation curable polyurethane binder is formed from the following components: (a) a polyisocyanate; (b) a polyol having a chain with two hydroxyl functional groups at one end of the chain and no hydroxyl functional groups at the opposed end of the chain; (c) an acrylate or methacrylate with one hydroxyl functional group (or with two or more hydroxyl functional groups) and having an acrylate functional group or a methacrylate functional group; in some instances, (d) a carboxylic acid-containing ionic acid including at least two hydroxyl functional groups or amino functional groups; in some instances, (e) a homopolymer or copolymer of poly(ethylene glycol) having one or two hydroxyl functional groups or one or two amino functional groups at one end of its chain; (f) a sulfonate or sulfonic acid having one or two amino functional groups; and in some instances, (g) an alcohol, or a diol, or an amine with a number average molecular weight less than 600.

In some examples disclosed herein, the polyurethane binder may be formed from components (a), (b), (c), (f) and any of i) component (d), ii) component (e), iii) component (g), or v) any combination of components (d), (e), and (g) (e.g., (d) plus (e); or (e) plus (g); or (d) plus (e) plus (g), etc.).

These components are selected so that the resulting radiation curable polyurethane binder has an acid number ranging from about 10 mg KOH/g to about 50 mg KOH/g; or ranging from about 15 mg KOH/g to about 45 mg KOH/g. The combination of these particular components and properties are believed to improve the decap performance, image quality, and print reliability of the inkjet ink. In addition, examples of the polyurethane dispersion exclude a reactive colorant.

In an example, the radiation curable polyurethane-based binder dispersion includes: water; and a radiation curable polyurethane dispersed in the water, the polyurethane having been formed from:

a polyisocyanate;

a polyol having a chain with two hydroxyl functional groups at one end of the chain and no hydroxyl groups at an opposed end of the chain, and having a number average molecular weight ranging from about 500 to about 5,000;

an acrylate or methacrylate, the acrylate or methacrylate having at least one hydroxyl functional group and having an acrylate functional group or a methacrylate functional group;

an alcohol or a diol or an amine having a number average molecular weight less than 600; and a sulfonate or sulfonic acid having one or two amino functional groups.

For component (a), any suitable polyisocyanate may be used. For example, a polyisocyanate having an average of two or more isocyanate groups may be used. In an example, the polyisocyanate may be an aliphatic, cycloaliphatic, araliphatic, or aromatic polyisocyanate, as well as products of their oligomers, used alone or in mixtures of two or more. In an example, the polyisocyanate is an aliphatic polyisocyanate or a cycloaliphatic polyisocyanate, either of which has a reduced tendency to yellow. Some example polyisocyanates include isophorone diisocyanate (IPDI), dicyclohexylmethane diisocyanate (H12MDI), hexamethylene-1,6-diisocyanate (HDI), 2,2,4-trimethyl-hexamethylene-diisocyanate (TMDI), 1,12-dodecane diisocyanate, 2,4,4-trimethyl-hexamethylene diisocyanate, 2-methyl-1,5-pentamethylene diisocyanate, and combinations thereof. In an example, the polyisocyanate is chosen from IPDI, H12MDI, HDI and TMDI.

The amount of the polyisocyanate within the binder dispersion ranges from about 20 wt % to about 50 wt % of the total wt % of the polyurethane in the dispersion. In an example, polyisocyanate makes up from about 20 wt % to about 30 wt % of the polyurethane binder.

Turning to component (b), the amount of component (b) (i.e., the polyol) within the radiation curable polyurethane binder dispersion ranges from about 10 wt % to about 70 wt % of the total wt % of the polyurethane in the dispersion. In an example, component (b) makes up from about 30 wt % to about 60 wt % of the polyurethane binder.

Component (b) is a particular polyol. The term "polyol", as used herein in connection with component (b), means any product having a chain with two hydroxyl groups at one end of the chain and no hydroxyl groups at the opposed end of the chain. The polyol has a number average molecular weight ($M_n$) ranging from about 500 to about 5000. In an example, the polyol has a number average molecular weight (Mn) ranging from about 2000 to about 4000. Additionally, the polyol has a glass transition temperature ($T_g$) ranging from about −20° C. to about 100° C. In an example, the glass transition temperature ranges from about 0° C. to about 80° C.

The polyol may be formed from the free radical polymerization of a monomer in the presence of a mercaptan that includes two hydroxyl functional groups or two carboxylic functional groups. The polyol may contribute to the improved decap of the inkjet ink because the hydroxyl groups at one end of the chain of the polyol are incorporated into the polyurethane backbone chain, while the group at the other end of the polyol forms a pendant group or pendant chain depending on what specific polyol is used. The polyol may segregate in the aqueous ink, which renders the polyurethane binder readily dispersible (i.e., more stable) in the ink vehicle. The polyol may also help prevent the polyurethane from swelling.

Some examples of the monomer used to form component (b) include an alkylester of acrylic acid or an alkylester of methacrylic acid, such as methyl (meth)acrylate, ethyl (meth)acrylate, n-butyl (meth)acrylate, tetrahydrofuryl (meth)acrylate, t-butyl (meth)acrylate, t-butyl acrylate, n-butyl acrylate, 2-ethylhexyl acrylate, 2-ethylhexyl (meth) acrylate, hexyl (meth)acrylate, cyclohexyl (meth)acrylate, phenyl (meth)acrylate, trifluoroethyl (meth)acrylate, benzyl (meth)acrylate, allyl (meth)acrylate, isobornyl (meth)acrylate, polyester (meth)acrylate, polycarbonate (meth)acrylate, 2-aziridinylethyl (meth)acrylate, aminomethyl acrylate, aminoethyl acrylate, isobornyl acrylate, aminopropyl (meth) acrylate, amino-n-butyl(meth)acrylate, N,N-dimethylaminoethyl(meth)acrylate, N,N-dimethylaminopropyl (meth) acrylate, N,N-diethylaminoethyl (meth)acrylate, and N,N-diethylaminopropyl (meth)acrylate.

Some other examples of the monomer used to form component (b) include an acid group containing monomer, such as acrylic acid, methacrylic acid, carboxyethyl (meth) acrylate, 2-(meth)acryloyl propionic acid, crotonic acid, and itaconic acid. In another example, the monomer used to form component (b) may be an acrylamide, an acrylamide derivative, methacrylamide, or a methacrylamide derivative. Some examples of acrylamide and methacrylamide derivatives include hydroxyethylacrylamide, N,N-methylol(meth)acrylamide, N-butoxymethyl (meth)acrylamide, diacetone acrylamide, and N-isobutoxymethyl (meth)acrylamide.

Some further examples of the monomer used to form component (b) may be styrene or a styrene derivative. Some examples of styrene derivatives include alpha-methyl styrene, p-aminostyrene, and 2-vinylpyridine. Additionally, the monomer used to form component (b) may be acrylonitrile, vinylidene chloride, a fluorine containing acrylate, a fluorine containing methacrylate, a siloxane containing acrylate, a siloxane containing methacrylate, vinyl acetate, or N-vinylpyrrolidone. Some specific examples include 2,2,2-Trifluoroethyl acrylate, 1H,1H,3H-Hexafluorobutyl acrylate, 1H,1H,3H-Tetrafluoropropyl methacrylate, 1H,1H,5H-Octafluoropentyl methacrylate, 1H,1H,5H-Octafluoropentyl acrylate, poly(dimethylsiloxane), METHACRYLOXYPROPYL TERMINATED® DMS-R11 (made by Gelest Chemicals), and ACRYLOXY TERMINATED® DMS-U21 (made by Gelest Chemicals). It is to be understood that any combination of monomers listed for component (b) may be used.

Some examples of the mercaptan used to form component (b) include 1,2-propanediol (thioglycerol), 1-mercapto-1,1-ethanediol, 2-mercapto-1,3-propanediol, 2-mercapto-2-methyl-1,3-propanediol, 2-mercapto-2-ethyl-1,3-propanediol, 1-mercapto-2,3-propanediol, 2-mercaptoethyl-2-methyl-1,3-propanediol, and thioglycolic acid.

In one example, component (b) may be formed by preparing a solution of the monomer and mercaptan in an organic solvent. When a combination of two monomers is used, the two monomers may be present in a ratio ranging from about 1:1 to about 9:1. In an example, methyl methacrylate and 2-ethylhexyl acrylate are used in a combination of 9:1 respectively. When a combination of three monomers is used, the three monomers may be present in a ratio ranging from about 5:4:1 to about 8:1:1. In an example, methyl methacrylate, 2-ethylhexyl acrylate, and methacrylic acid are used in a combination of 5:4:1 respectively. Examples of other suitable monomer combinations used in forming component (b) may be found in Table 1 of the Examples section.

After the solution (including the monomer and the mercaptan) is prepared, the solution is placed in an inert environment. For example, a flow of nitrogen gas may be introduced through the solution to create the inert environment. The solution may then be heated to a suitable temperature for polymerization, and the reaction may be allowed to occur for a suitable time. The time and temperature for polymerization will depend upon the monomer(s)

and mercaptan(s) used. In an example, the polymerization temperature is about 50° C. to about 90° C., and the reaction is allowed to occur for about 6 hours. In another example, the polymerization temperature is about 70° C.

The polyol formed may include the mercaptan ranging from about 2 wt % to about 10 wt % based on the total wt % of the polyol. In an example, the mercaptan may make up about 5 wt % of the total wt % of the polyol.

The radiation curable polyurethane-based binder dispersion further includes component (c). Component (c) includes an acrylate or methacrylate with at least two hydroxyl functional groups and an acrylate functional group or a methacrylate functional group. Component (c) may also be an acrylate or methacrylate having one hydroxyl functional group or one amino functional group. In this example, component (c) is present in an amount ranging from greater than 0 wt % to about 40 wt % based on the total wt % of the radiation curable polyurethane in the polyurethane dispersion. In another example, component (c) may be present in an amount ranging from about 5 wt % to about 30 wt % based on the total wt % of the radiation curable polyurethane in the polyurethane dispersion. In another example, component (c) may be present in an amount ranging from about 10 wt % to about 20 wt % based on the total wt % of the radiation curable polyurethane in the polyurethane dispersion.

Component (c) renders the polyurethane curable via ultraviolet light or some other suitable electromagnetic radiation. In addition, component (c) increases the double bond density and improves the curing efficiency.

Some examples of the acrylate or methacrylate with at least two hydroxyl functional groups include those obtained from the reaction of diglycidyl compounds with (meth)acrylic acid. Aliphatic diglycidyl compounds derived from alpha, omega diols having 4 to 12 carbon atoms or from polyoxyalkylenediols (such as polyethylene glycol, polypropylene glycol, or mixtures thereof that contain oxyalkylene group(s)) may be used. Some specific examples include 1,4-butanediol diglycidyl ether, 1,6-hexanediol diglycidyl ether, cyclohexanedimethanol diglycidyl ether, polyethylene glycol diglycidyl ether, and polypropylene glycol diglycidyl ether. An additional example is 1,6-hexanediylbis[oxy(2-hydroxy-3,1-propanediyl)] bisacrylate. Some commercially available examples include MIRAMER® PE-210 (bisphenol A epoxy acrylate) and MIRAMER® PE-230 (aliphatic alkyl epoxy acrylate) (both of which are available from Miwon Chemical).

In further examples, component (c) includes aromatic diglycidyl compounds derived from bisphenol A and bisphenol F. Specifically, bisphenol A diglycidyl ether (BADGE), bisphenol F diglycidyl ether, and their ethoxylated and/or propoxylated equivalents may be used. Diglycidyl esters may also be used, such as diglycidyl phthalate, N,N-diglycidyl aniline, or N,N-diglycidyl-4-glycidyloxyaniline. Some specific examples include a diacrylate ester of bisphenol A diglycidyl ether (e.g., bisphenol A glycerolate diacrylate (BGDA)) and a dimethacrylate ester of bisphenol A diglycidyl ether (e.g., butylene glycol dimethacrylate (BGDM)).

In an example, component (c) is chosen from 1,6-hexanediylbis[oxy(2-hydroxy-3,1-propanediyl)] bisacrylate, MIRAMER® PE-210 (bisphenol A epoxy acrylate), and MIRAMER® PE-230 (aliphatic alkyl epoxy acrylate).

Some examples of an acrylate or methacrylate having one hydroxyl functional group or one amino functional group include the esterification products of aliphatic and/or aromatic polyols with acrylic acid or methacrylic acid. These products have a residual OH functionality of about 1. Some of these products also have at least two acrylic functionalities. Examples of the acrylate or methacrylate having one hydroxyl functional group or one amino functional group include the partial esterification products of acrylic acid and/or methacrylic acid with tri-, tetra-, penta- or hexahydric polyols or mixtures thereof. These modified or unmodified polyols are partly esterified with acrylic acid, methacrylic acid or mixtures thereof until the desired residual hydroxyl functionality is reached. Suitable examples include acrylic or the methacrylic esters with linear and branched polyols in which the at least one hydroxyl functionality remains free, such as hydroxyalkylacrylates or hydroxyalkylmethacrylates having 1 to 20 carbon atoms in the alkyl group. Some specific examples include hydroxyethylacrylate (HEA), hydroxyethylmethacrylate (HEMA), hydroxybutylacrylate (HBA), hydroxybutylmethacrylate (HBMA), (3-(acryloxy)-2-hydroxypropyl methacrylate) (AHPMA), glycerol diacrylate, trimethylolpropane diacrylate, pentaerythritoltriacrylate (PETA), ditrimethylolpropane triacrylate (DTPTA), dipentaerythritol pentaacrylate (DPPA), and (poly)ethoxylated and/or (poly)propoxylated equivalents of glycerol diacrylate, trimethylolpropane diacrylate, PETA, DTPTA, or DPPA.

In some instances, component (d) may also be used to form the polyurethane. Component (d) is a carboxylic acid. The amount of component (d) (if included) within the binder dispersion ranges from greater than 0 wt % to about 10 wt % based upon the total wt % of the polyurethane. In an example, component (d) makes up from about 1 wt % to about 4 wt % of the polyurethane binder in the dispersion.

The presence of component (d) assists in the ability of the polyurethane to be dissolved or dispersed in water after ionization with a base. As previously stated, component (d) is a carboxylic acid. In some instances, component (d) includes two or more hydroxyl functional groups. Component (d) may have a number average molecular weight ($M_n$) of about 500. Examples of component (d) may be derived from hydroxy-carboxylic acids having the general formula $(HO)_xQ(COOH)_y$, where Q is a straight or branched hydrocarbon radical containing 1 to 12 carbon atoms, and x is 2 or 3 and y ranges from 1 to 3. Examples of suitable hydroxy-carboxylic acids include dimethylol propionic acid (DMPA), dimethylol butanoic acid (DMBA), alanine, citric acid, tartaric acid, glycolic acid, lactic acid, malic acid, dihydroxymaleic acid, dihydroxytartaric acid, or mixtures thereof. In an example, component (d) is chosen from DMPA and DMBA.

With respect to component (e), in some examples, component (e) is a homopolymer or copolymer of poly(ethylene glycol) (e.g., poly(ethylene oxide)) having one hydroxyl functional group or one amino functional group. In other examples, component (e) may be a homopolymer or copolymer of poly(ethylene glycol) (e.g., poly(ethylene oxide)) having two hydroxyl functional groups or two amino functional groups at one end of its chain. The homopolymer or copolymer of poly(ethylene glycol) has a number average molecular weight ($M_n$) ranging from about 500 to about 5,000. In another example, the homopolymer or copolymer of poly(ethylene glycol) has a number average molecular weight ($M_n$) ranging from about 500 to about 3,000. In an example, component (e) also has a water solubility of greater than 30% v/v (volume of poly(ethylene glycol) to volume of water).

Examples of the radiation curable polyurethane dispersion disclosed herein including component (e) increase the gloss and optical density of a printed image on media when compared to the gloss and optical density of a printed image on the same media formed with an ink that includes other types of polyurethane dispersions that do not include component (e). This may be due, in part, because, when included, component (e) prevents the polyurethane binder from reacting with an underlying pre-treatment fixing fluid, which may otherwise cause the polyurethane binder to undesirably coagulate when the ink composition is applied to the medium. As such, component (e) renders the polyurethane binder insensitive to the pre-treatment fixing fluid, and thus prevents undesirable polyurethane coagulation. Since the polyurethane binder does not strongly interact with the pre-treatment fixing fluid to cause coagulation, the polyurethane can form a film when printed and cured, which advantageously affects the gloss and optical density of the printed image.

The amount of component (e) in the radiation curable polyurethane binder dispersion (when included) ranges from greater than 0 wt % to about 20 wt % based upon the total wt % of the polyurethane. In an example, component (e) is present in an amount ranging from about 5 wt % to about 15 wt % of the polyurethane binder.

Any copolymer of poly(ethylene glycol) with one hydroxyl or amino group may be used as component (e), as long as the copolymer has water solubility of >30% v/v and a suitable number average molecular weight. Some examples of suitable copolymers for component (e) include a copolymer of poly(ethylene) and poly(ethylene glycol) with one hydroxyl functional group (e.g.,

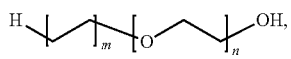

where m=1-10 and n=5-50, a copolymer of poly(propylene glycol) and poly(ethylene glycol) with one hydroxyl functional group, and a copolymer of poly(ethylene glycol) and poly(propylene glycol) with one amino functional group. Some commercially available examples of the copolymer of poly(ethylene glycol) and poly(propylene glycol) with one amino functional group include JEFFAMINE® M-1000 (i.e.,

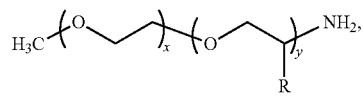

where x=19 and y=3) and JEFFAMINE® M-2070 (i.e.,

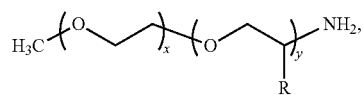

where x=31 and y=10) (both produced by Huntsman Chemicals).

Some additional examples of component (e) include a poly(ethylene glycol) homopolymer, such as monoamine terminated poly(ethylene glycol) (i.e.,

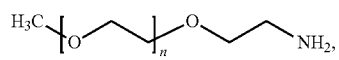

where n=5-100, and a poly(ethylene glycol) mono alkyl ether. Examples of the poly(ethylene glycol) mono alkyl ether include an alkyl group with C1 to C8 straight or branched hydrocarbons, such as methyl, ethyl, and butyl groups. Examples of the poly(ethylene glycol) mono alkyl ether include poly(ethylene glycol) monomethyl ether (i.e.,

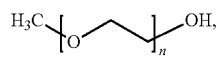

where n=5-100, poly(ethylene glycol) monoethyl ether, poly(ethylene glycol) monopropyl ether, and poly(ethylene glycol) monobutyl ether.

Furthermore, any homopolymer of poly(ethylene glycol) with two hydroxyl or amino groups at one end of the polymer chain may alternatively be used as component (e), as long as the homopolymer has water solubility of >30% v/v and a suitable number average molecular weight. As an example, the homopolymer may be two hydroxyl terminated poly(ethylene glycol), where both hydroxyls are located at one end of the chain. One commercially available example is YMER™ N120 (a linear difunctional polyethylene glycol monomethyl ether from Perstorp Polyols Inc., Toledo, Ohio) having the following formula:

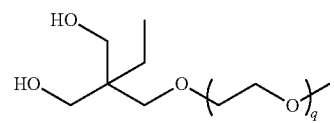

where q=20).

Turning now to component (f), component (f) is a sulfonate or sulfonic acid having one or two amino functional groups. The radiation curable polyurethane dispersion disclosed herein including component (f) improves the decap performance and print reliability of the inkjet ink including the dispersion, without sacrificing (and in some instances improving) image quality. Component (f) may be present in an amount ranging from greater than 2 wt % to about 20 wt % based upon the total wt % of the radiation curable polyurethane. In an example, component (f) is present in an amount ranging from about 5 wt % to about 20 wt % of the radiation curable polyurethane. In another example, component (f) may be present in an amount from about 5 wt % to about 15 wt % of the radiation curable polyurethane.

Some examples of component (f) include taurine

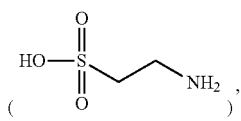

4-Aminotoluene-3-sulfonic acid

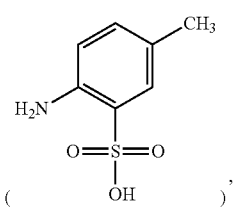

Aniline-2-sulfonic acid

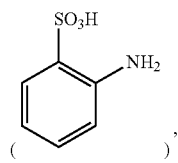

Sulfanilic acid

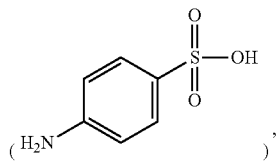 [SMILES: Nc1ccc(S(=O)(=O)O)cc1]

4-Amino-1-naphthalenesulfonic acid

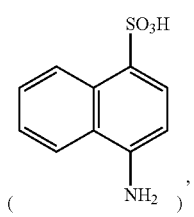

3-Amino-4-hydroxybenzenesulfonic acid

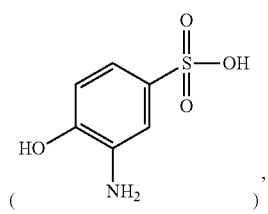 [SMILES: Nc1cc(S(=O)(=O)O)ccc1O]

2-Amino-1-naphthalenesulfonic acid

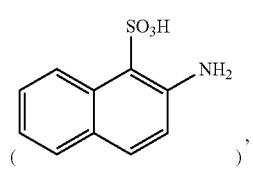

5-Amino-2-methoxybenzenesulfonic acid

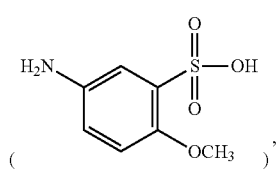

3-2-(aminoethyl)aminopropanesulfonic acid ($H_2N$—$CH_2$—$CH_2$—NH—$CH_2CH_2$—$CH_2$—$SO_3H$), 2-2-(aminoethyl)aminoethanesulfonic acid

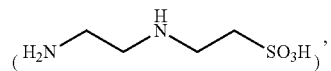

N,N-Bis(2-hydroxyethyl)taurine

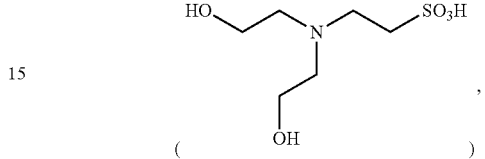

2-(Cyclohexylamino)ethanesulfonic acid

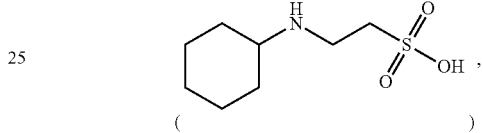

4-(2-Hydroxyethyl)piperazine-1-ethanesulfonic acid

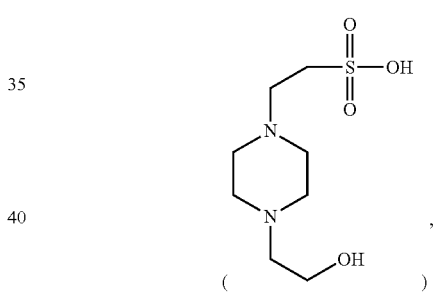

3-Amino-1-propanesulfonic acid

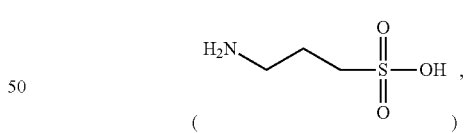

and N-(2-acetamido)-2-aminoethanesulfonic acid

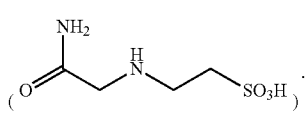 [SMILES: NC(=O)CNCCS(=O)(=O)O]

In an example, component (f) is chosen from taurine and 3-2-(aminoethyl)aminopropanesulfonic acid (also known as ethyldiaminepropylsulfonate (EPS)).

It is to be understood that in some examples, component (f) may have, at most, one hydroxyl functional group in addition to a hydroxyl functional group in the sulfonate or sulfonic acid functional groups. Examples of component (f) including, at most, the one hydroxyl functional group include taurine, 4-aminotoluene-3-sulfonic acid, aniline-2-sulfonic acid, sulfanilic acid, 4-amino-1-naphthalenesulfonic acid, 3-amino-4-hydroxybenzenesulfonic acid, 2-amino-1-naphthalenesulfonic acid, 5-amino-2-methoxybenzenesulfonic acid, 2-(cyclohexylamino)ethanesulfonic acid, and 3-amino-1-propanesulfonic acid.

Further, some examples of component (f) function as a chain extender of the polyurethane.

The polyurethane binder dispersion may further include component (g). Component (g) includes an alcohol, or a diol, or an amine. The alcohol or diol or amine has a number average molecular weight ($M_n$) of less than 600. In an example, component (g) (if included) is present in an amount ranging from greater than 0 wt % to about 20 wt % based on the total wt % of the polyurethane. In another example, component (g) may be present in an amount ranging from greater than 0 wt % to about 15 wt %.

Some examples of the alcohol or diol include methanol, ethanol, 1-butanol, propanol, 1,2-propanediol, 1,4-butanediol, 1,5-pentanediol, 1,6-hexanediol, neopentyl glycol, 1,4-cyclohexanediol, cyclohexane-1,4-dimethanol (cyclohexanedimethanol (CHDM)), ethylene glycol, diethylene glycol, triethylene glycol, Bisphenol A, Bisphenol A ethoxylate (BPAE, $M_n$=492), Bisphenol A (2,3-dihydroxypropyl) glycidyl ether, Bisphenol A bis(3-chloro-2-hydroxypropyl) ether, Bisphenol A bis(2,3-dihydroxypropyl) ether, Bisphenol A propoxylate, 4,4'-Sulfonyldiphenol, polycarbonate diol, and polyester diol. Examples of polycarbonate diols are Desmophen C XP-2716 (available from Covestro (formerly Bayer MaterialScience)), Placcel CD 205PL (Daicel Corporation), Kuraray Polyol C-590 (Kuraray Co., Ltd.). In an example, component (g) is selected from CHDM, BPAE, and polycarbonate diol. Examples of the amine include n-butylamine and ethylene diamine.

In an example of the first step of the method for making the radiation curable polyurethane binder dispersion, components (a), (b), and (c), in some instances (d), and (g) are mixed in a reactor with the organic solvent (e.g., methyl ethyl ketone (MEK), tetrahydrofuran (THF), ethyl acetate, acetone, or combinations thereof) and a catalyst (e.g., dibutyl tin dilaurate, bismuth octanoate, and 1,4-diazabicyclo [2.2.2]octane). The reactor may be maintained at a constant temperature and under a dry air mixture. The components may be mixed and the polymerization reaction may be allowed to occur until the % NCO (cyanate) reaches the theoretical value. In an example, the reaction time ranges from about 1 hour to about 6 hours. In another example, the polymerization reaction occurs for about 5 hours at 60° C. to achieve the theoretical value of the % NCO.

In an example of the second step of the method for making the polyurethane polymer, component (e) may then be added to the polymerization reaction of components (a), (b), and (c), and in some instances (d) and (g). Polymerization is continued until the % NCO reaches the theoretical value. In this step, the polymerization reaction may be allowed to occur for a time ranging from about 1 hour to about 13 hours. In an example, the polymerization reaction occurs for 12 hours at 60° C. to achieve the theoretical value of the % NCO. In examples in which component (d) is not included, this step may skipped and the method may continue as described below.

In an example of the third step of the method for making the polyurethane polymer, component (f) is dissolved in one equivalent of a base and a sufficient amount of deionized water to fully dissolve component (f). Some examples of the base include ammonia, trimethylamine, triethylamine, sodium hydroxide, potassium hydroxide, and lithium hydroxide. The polymer solution made from components (a), (b), and (c), and in some instances (d), (e) and/or (g) is cooled to a temperature ranging from about 30° C. to about 50° C. The aqueous solution of component (f) is added to the polymer solution from the first step (if component (e) is not included) or the second step (if component (e) is included) with vigorous mixing at a temperature ranging from about 30° C. to about 50° C. for about 30 minutes.

In an example of the fourth step of the method for making the polyurethane polymer, the polyurethane solution may be added to water including a base (e.g., over a 60 minute period) with vigorous agitation or vice versa. The mixture may be stirred and organic solvent may be removed by distillation to form the polyurethane binder dispersion. In an example, the acid number of the radiation curable polyurethane binder dispersion ranges from about 10 mg KOH/g solid resin to about 50 mg KOH/g solid resin, or from about 15 mg KOH/g solid resin to less than 45 mg KOH/g solid resin, or from about 10 mg KOH/g solid resin to less than 35 mg KOH/g solid resin.

Once the polyurethane binder dispersion is prepared, the average particle size of the polyurethane binder in the dispersion ranges from about 10 nm to about 100 nm in radius. In an example, the average particle size of the polyurethane binder ranges from about 10 nm to about 50 nm in radius. The double bond density of the polyurethane binder dispersion may range from about 0.2 meq/g polymer to about 4.0 meq/g polymer.

After the ink (including an example of the radiation curable polyurethane binder) is prepared, the ink(s) may be applied to a medium using any inkjet printer (e.g., thermal, piezoelectric, etc.). In an example, the ink(s) may be applied to a coated offset medium. A coated offset medium is any paper coated to impart better image quality by providing some degree of surface gloss, smoothness, and reduced ink absorbency. Examples of commercially available coated offset media include STERLING® Ultra Gloss (NewPage Corp.) and UTOPIA® (Appleton Coated LLC). In other examples, the medium may be coated or uncoated paper. The medium may also be a vinyl or plastic material.

The ink may then be exposed to curing. Any suitable source of UV radiation may be used to initiate curing, such as, for example, UV lamps, LED (light emitting diode) lamps, LEP (light emitting plasma) plasma torches, or lasers operating in the UV range. Electron beam curing may also be used. The actual wavelength (within the UV range of 280 nm to 400 nm) and intensity of the ultraviolet radiation used may vary, depending at least in part, upon the curable polymer components (e.g., the polyurethane binder) included in the ink. Once the ink is cured, a film forms on the medium.

The inkjet ink may be paired with a pre-treatment fixing fluid in an inkjet ink set. In some instances, a pre-treatment fixing fluid may be applied to the medium prior to printing the inkjet ink onto the medium. The pre-treatment fixing fluid is described in greater detail below.

The pre-treatment fixing fluid may be suitable for wet-on-wet printing on the coated offset media. The pre-treatment fixing fluid includes a particular combination of salts (at a desirably low content), a particular co-solvent, and a low HLB (hydrophilic-lipophilic balance) surfactant that is capable of dynamically lowering the surface tension of the pre-treatment fluid. In the examples disclosed herein, HLB is less than 10. The selected salt(s), solvent, and surfactant together may advantageously promote dot gain and reduce feathering and pigment flotation, resulting in higher quality text prints. The composition of the pre-treatment fixing fluid disclosed herein also exhibits desirable pen reliability.

Examples of the pre-treatment fixing fluid disclosed herein include calcium propionate, calcium pantothenate, tetraethylene glycol, a low HLB surfactant, an acid, and a balance of water. In some examples, the pre-treatment fixing fluid consists of these components alone, and in other examples, the pre-treatment fixing fluid includes these components and an anti-microbial agent.

The combination of calcium propionate and calcium pantothenate provides the pre-treatment fixing fluid with metal salts that may cause the pigment or colorant in the ink deposited thereon to coagulate, and that may control pigment migration/flotation etc. The calcium propionate may be present in an amount ranging from greater than 4.5 wt % to about 8.0 wt % based on the total wt % of the pre-treatment fluid. The calcium pantothenate may be present in an amount ranging from about 2.0 wt % to 15 wt % or less. In an example, the pre-treatment fixing fluid may include about 6.5 wt % of calcium propionate and about 4.8 wt % of calcium pantothenate. The amount of the metal salts is believed to be high enough to achieve the desired fixing effect without deleteriously affecting pen reliability.

The pre-treatment fixing fluid also includes tetraethylene glycol as a co-solvent. The tetraethylene glycol may be present in total in the pre-treatment fixing fluid in a range from about 0.1 wt % to about 30 wt %. The amount used may depend, at least in part, on the jetting architecture used to apply the pre-treatment fixing fluid. In an example, the amount of tetraethylene glycol used is about 12 wt %.

The pre-treatment fixing fluid also includes the low HLB surfactant. This type of surfactant is capable of dynamically controlling, in particular, lowering the surface tension of the pre-treatment fixing fluid. The low HLB surfactant may provide the pre-treatment fluid, at the time of its application, with a surface tension that is lower than the surface energy of the coated offset medium upon which the pre-treatment fixing fluid is being applied. As such, the contact angle between the pre-treatment fixing fluid and the medium is zero (0), which enables the pre-treatment fixing fluid to spread out across the medium surface in a horizontal direction (with respect to the medium surface), and effectively wet and reduce the surface energy of the offset coated medium.

Examples of the low HLB surfactant are a self-emulsifiable wetting agent based on acetylenic diol chemistry (e.g., SURFYNOL® SE-F) or a non-ionic, alkylphenylethoxylate and solvent free surfactant (e.g., CARBOWET® GA-211 surfactant, a.k.a. SURFYNOL® CT-211, from Air Products and Chemicals, Inc.). The low HLB surfactant is present in the pre-treatment fixing fluid in an amount ranging from about 0.01 wt % to about 1.0 wt % based on the total wt % of the pre-treatment fixing fluid. In an example, the amount of the surfactant is about 0.05 wt %. It is believed that the desired surface tension may not be obtainable with other amounts and/or other surfactants.

In some examples, the pre-treatment fixing fluid may also include an antimicrobial agent. Antimicrobial agent(s), such as biocides and fungicides, may be added to inhibit the growth of harmful microorganisms. Example antimicrobial agents may include the NUOSEPT® (Ashland Inc.), UCAR-CIDE® or KORDEK® (Dow Chemical Co.), and PROXEL® (Arch Chemicals) series, and combinations thereof. A total amount of the antimicrobial agents in the pre-treatment fixing fluid may range from about 0.05 wt % to about 1 wt %. In an example, the pre-treatment fixing fluid includes about 0.1 wt % of a biocide.

The balance of the pre-treatment fixing fluid is water (e.g., deionized water). In addition, buffer(s) may be used to adjust the pH of the pre-treatment fixing fluid to a particular pH. One example of a suitable buffer is methanesulfonic acid. In some examples, the buffer may be used in an amount sufficient to buffer the pH of the pre-treatment fixing fluid so that it ranges from 4.0 to 7.0. In an example, the pH of the pre-treatment fixing fluid is adjusted to about 6.6 using methanesulfonic acid.

As described above, the surface tension of the pre-treatment fixing fluid is lower than the surface energy of the offset coated medium so that when the pre-treatment fixing fluid is applied on the surface of the offset coated medium, the contact angle between the pre-treatment fixing fluid and the offset coated medium is 0. In an example, the surface tension of the pre-treatment fixing fluid is below 37 dyne/cm. In another example, the surface tension of the pre-treatment fixing fluid ranges from about 30 dyne/cm to about 33 dyne/cm. In still another example, the surface energy of the coated offset medium ranges from about 34 dyne/cm to about 42 dyne/cm, and the surface tension of the pre-treatment fixing fluid is about 33 dyne/cm or lower.

The pre-treatment fixing fluid may be applied onto the medium using any suitable high speed (e.g., from about 50 fpm to about 1000 fpm) inkjet printing apparatus, including thermal inkjet printers or web presses, piezoelectric inkjet printers or web presses, continuous inkjet printers or web presses.

In an example, the amount of pre-treatment fixing fluid that is applied to the medium ranges from about 1 gsm to about 7 gsm.

In the examples disclosed herein, no drying operation is performed after the pre-treatment fixing fluid is applied on the medium. Rather, while the pre-treatment fixing fluid is wet, the inkjet ink disclosed herein is deposited on the pre-treatment fixing fluid on the medium. When multiple ink colors are used, it is to be understood that all of the inks are applied while previously deposited layers are still wet. The ink(s) is also formulated to be deposited by the inkjet printing system.

The salts present in the pre-treatment fixing fluid instantaneously react with the colorant present in the ink, causing the pigment to crash out of ink and fixing the pigment on the medium surface. In addition, the applied pre-treatment fixing fluid provides the coated offset medium with a reduced surface energy, which causes the deposited ink(s) to spread less than if the surface energy were higher. This contributes to bleed control and dot gain, and thus enhances the print quality attributes. This benefit is in addition to the benefits obtained from the instantaneous fixing of the colorant(s) in the ink by the salts in the pre-treatment fixing fluid.

To further illustrate the present disclosure, examples are given herein. It is to be understood that these examples are provided for illustrative purposes and are not to be construed as limiting the scope of the present disclosure.

EXAMPLES

Example 1

Several examples of the radiation curable polyurethane binder dispersion disclosed herein and several comparative polyurethane dispersion examples were prepared. Several examples of the polyol having two hydroxyl groups at one end of the polymer chain were also prepared for use in the example polyurethane binder dispersions. The compositions of the various polyols used to form the example polyurethane dispersions are shown in Table 1. The compositions of the example and comparative example radiation curable polyurethane dispersions are shown in Table 2, with the wt % of each component that was used. Evaluations of several properties (as compared to a control black ink) of black inks containing the resulting example and comparative radiation curable polyurethane binder dispersions are provided in Table 6. The inks are identified in Table 6 according to the radiation curable polyurethane dispersion (PUD) in the respective ink.

One of the example polyols, referred to herein as Polyol-8 (MMA/EHA copolymer with weight ratio 50/50), was synthesized as follows:

600 g of methyl methacrylate (MMA), 600 g of 2-ethylhexylacrylate (EHA), 60 g of thioglycerol, 12 g of azobisisobutylonitrile (AIBN), and 800 g of acetone were mixed in a beaker until the solution became homogeneous. The solution was transferred to a 3-liter four neck round bottom flask equipped with a mechanical stirrer, a condenser and a nitrogen inlet. The monomer solution was purged with dry nitrogen for 20 minutes and heated with a water bath at 75° C. for six hours. A viscous polymer solution was obtained. The number average molecular weight ($M_n$) was 2200. The weight average molecular weight ($M_w$) was calculated to be 3800 by Gel Permeation Chromatography. The % solid was 67%.

Another of the example polyols, referred to herein as Polyol-14 (MMA/EHA copolymer with weight ratio 75/25), was synthesized as follows:

80 g of thioglycerol, 16 g of azobisisobutylonitrile (AIBN), 1200 g of methyl methacrylate (MMA), 400 g of 2-ethylhexylacrylate (EHA), and 1000 g of acetone were mixed in a beaker until completely dissolved. The solution was transferred to a reagent bottle with a narrow opening and purged with nitrogen. A 3-liter 4-neck round bottom flask was immersed in a water bath. A mechanical stirrer, a condenser and a nitrogen inlet were attached. The water bath temperature was raised to 75° C. 300 ml of monomer solution was pumped into the reactor (i.e., the flask) and polymerized for 15 minutes. The rest of the monomer solution was pumped into the reactor for about 120 minutes. Polymerization was continued overnight (it may be shorter but should be analyzed by gas chromatography (GC)/liquid chromatography (LC) at 75° C.). A small sample of Polyol-14 was analyzed by GC and LC to ensure the complete conversion of monomers, thioglycerol and AIBN. The Polyol-14 was cooled to 40° C. and bottled. The weight average molecular weight ($M_w$) was calculated to be 3500 using Gel Permeation Chromatography. The % solid is 73%.

Each of the other example polyols was prepared in a similar manner as described for polyol-8 and polyol-14, using the components and amounts set forth in Table 1.

The following abbreviations are used in Table 1: MMA—methyl methacrylate, BA—n-butyl acrylate, EHA—2-ethylhexylacrylate, MAA—methacrylic acid, t-BA—t-butyl acrylate, BMA—n-butyl methacrylate, BzMA—benzyl methacrylate, AN—acrylonitrile, CHMA—cyclohexyl methacrylate, IBM—isobornyl methacrylate, IBA—isobornyl acrylate, DAA—diacetone acrylamide, Sty—styrene, TFMA—trifluoroethyl methacrylate, MEK—methyl ethyl ketone, and THF—tetrahydrofuran.

TABLE 1

| Polyol | Monomers | Ratio of Monomers | Thioglycerol (wt % of polyol) | Tg (° C.) | Solvent |
|---|---|---|---|---|---|
| Polyol-2 | MMA/BA | 50/50 | 10% | * | Acetone |
| Polyol-7 | MMA/EHA | 75/25 | 5% | 47 | MEK |
| Polyol-8 | MMA/EHA | 50/50 | 5% | 4 | THF |
| Polyol-9 | MMA/EHA | 90/10 | 5% | 80 | THF |
| Polyol-10 | MMA/EHA/MAA | 50/40/10 | 5% | 15 | THF |
| Polyol-12 | MMA/EHA | 50/50 | 10% | 4 | THF |
| Polyol-13 | Allyl Methacrylate/EHA | 70/30 | 5% | 10.8 | THF |
| Polyol-14 | MMA/EHA | 75/25 | 5% | 47 | THF |
| Polyol-15 | AN/BA | 60/40 | 5% | 12.5 | THF |
| Polyol-16 | BzMA/EHA | 80/20 | 5% | 25 | THF |
| Polyol-17 | CHMA/EHA | 66/34 | 5% | 24 | Acetone |
| Polyol-18 | MMA/EHA/DAA | 50/45/5 | 5% | 4 | Acetone |
| Polyol-19 | MMA/EHA | 63/37 | 5% | 25 | Acetone |
| Polyol-20 | MMA/EHA/DAA | 75/20/5 | 5% | 50 | Acetone |
| Polyol-22 | IBM/BA | 65/35 | 5% | 46 | Acetone |
| Polyol-23 | CHMA/EHA | 80/20 | 5% | 49 | Acetone |
| Polyol-24 | BzMA/EHA | 95/5 | 5% | 46 | Acetone |
| Polyol-25 | MMA/EHA | 75/25 | 2.50% | 47 | Acetone |
| Polyol-26 | t-BA/BMA | 80/20 | 5% | 47 | Acetone |
| Polyol-30 | CHMA/EHA | 95/5 | 5% | 80 | Acetone |
| Polyol-31 | IBA/MMA/BA | 20/57/23 | 5% | 49.6 | Acetone |
| Polyol-32 | IBA/MMA/BA | 40/38/22 | 5% | 50.22 | Acetone |
| Polyol-34 | BzMA/MMA/BA | 20/60/20 | 5% | 48.3 | Acetone |
| Polyol-35 | BzMA/MMA/BA | 40/44/16 | 5% | 47.7 | Acetone |
| Polyol-36 | CHMA/MMA/BA | 20/57/23 | 5% | 48.9 | Acetone |
| Polyol-37 | CHMA/MMA/BA | 40/38/22 | 5% | 49 | Acetone |
| Polyol-38 | IBA/MMA/EHA | 20/57/23 | 5% | 49.6 | Acetone |
| Polyol-39 | Sty/BMA | 40/60 | 5% | 47.5 | Acetone |
| Polyol-41 | TFMA/MMA/BA | 10/65/25 | 5% | 47 | Acetone |

* Tg unavailable; however, other properties of Polyol-2 were as follows: number average molecular weight ($M_n$) = 1800, weight average molecular weight ($M_w$) calculated to be 2400 using Gel Permeation Chromatography, and % solid = 78%.

Polyol-14 was then used in the synthesis of the example polyurethane dispersions. Each of the examples shown in Table 1 may be used to form examples of the radiation curable polyurethane binder and dispersions disclosed herein. The example and comparative example polyurethane dispersions are discussed in greater detail below.

One of the example polyurethane binder dispersions, referred to herein as PUD-19 was synthesized as follows: (Part 1) 67.01 g of bisphenol A glycerolate diacrylate (BGDA), 0.67 g of 4-methoxyphenol (MEHQ), 351.2 g of Polyol-14 (% solid=73%), 7.95 g of dimethylol propionic acid (DMPA), and 200 g of acetone were mixed in a 2000 ml 4-neck round bottom flask. 105.4 g of isophorone diisocyanate (IPDI) and 20 g of acetone was added to the flask. A mechanical stirrer (with a glass rod and a TEFLON® blade) and a condenser were attached. The flask was immersed in a constant temperature bath at 60° C. The reactor system was maintained under dry oxygen blanket. 15 drops of dibutyl tin dilaurate (DBTDL) were added to initiate the polymerization. Polymerization was continued for 5 hours at 60° C. 0.5 g samples were withdrawn for % NCO titration to confirm the reaction. The theoretical % NCO should be 3.1%, but the actual % NCO is about 5.4% (this is typical for a graft polyurethane—a slow reaction). (Part 2) 23.7 g of JEFFAMINE® M-2070, and 10 g of acetone were mixed in a beaker and added to the reactor system. 5 g of acetone was used to rinse off the residual monomers. The polymerization was continued for 12 hours at 60° C. 0.5 g of prepolymer was withdrawn for final % NCO titration. The theoretical % NCO should be 2.78%, but usually is about 3.1% at this point. The water bath temperature was reduced to 40° C.

(Part 3) 39.56 g of taurine, 25.2 g of 50% NaOH, and 197.8 g of deionized water were mixed in a beaker until the taurine was completely dissolved. This solution was added to the prepolymer solution in the reactor system at 40° C. with vigorous stirring over 1-3 minutes. The water bath temperature dropped to about 36° C. and was raised to 44° C.-45° C. The water bath temperature was kept between 40° C. and 45° C. for 30 minutes to complete the reaction. The solution became clear during the 30 minutes.

(Part 4) The clear polymer solution was added to 1755 g of cold deionized water with 7.3 g of 45% potassium hydroxide (KOH), with agitation for 60 minutes at room temperature to form a polyurethane dispersion (PUD). The PUD was filtered through a 400 mesh stainless sieve. Acetone was removed with a Rotovap at 55° C. The final PUD was filtered through fiberglass filter paper.

The average particle size of the PUD was measured by a Malvern Zetasizer, and was 30 nm-35 nm in radius. The pH was 7.2. The % Solid was 22.0%.

Each of the other example and comparative example radiation curable polyurethane dispersions were prepared in a similar manner to PUD-19, using the components and amounts set forth in Table 2. The example of component (b) used to form the comparative example polyurethane dispersion CPUD-1 had the hydroxyl groups at opposed ends of the backbone chain.

The following abbreviations are used in Table 2: AN (acid number (mg KOH/g)), DB (double bond density (meq/g polymer)), DMPA (2,2'-Dimethylol Propionic Acid), M-2070 (JEFFAMINE® M-2070 from Huntsman Chemical), N-120 (YMER™ N120 linear difunctional polyethylene glycol monomethyl ether), EPS (ethyldiaminepropylsulfonate), HDI (hexamethylene-1,6-diisocyanate), IPDI (Isophorone diisocyanate), PTMG1K (Poly(tetrahydrofuran, $M_n$ of 1000), BGDA (bisphenol A glycerolate diacrylate), PETA (pentaerythritoltriacrylate), AHPMA (3-(acryloxy)-2-hydroxypropyl methacrylate), HBA (hydroxybutylacrylate), HEA (hydroxyethylacrylate), TMDI (2,2,4-trimethyl-hexamethylene-diisocyanate), and H12MDI (dicyclohexylmethane diisocyanate). PTMG1K is a polyol with hydroxyl groups at both ends of the polymer chain.

TABLE 2

| ID | AN | DB | Group (a) Type | % | Group (b) Polyol 1 | % Polyol 1 | Group (c) Monomer 1 | % Monomer 1 |
|---|---|---|---|---|---|---|---|---|
| CPUD-1 | 16.2 | 5.2 | HDI | 20.4 | PTMG1K | 23.2 | BGDA | 5.34 |
| CPUD-2 | 30.2 | 4 | HDI | 27.8 | | | BGDA | 33.3 |
| CPUD-3 | 30.7 | 1.0 | IPDI | 32.5 | Polyol-2 | 46.1 | HBA | 14 |
| CPUD-4 | 30.9 | 1.1 | IPDI | 29.4 | Polyol-4 | 47.6 | BGDA | 5.34 |
| CPUD-5 | 29.5 | 1.0 | IPDI | 28 | Polyol-4 | 45.4 | BGDA | 5.09 |
| CPUD-6 | 32.1 | 0.0 | IPDI | 30.4 | Polyol-8 | 49.4 | BGDA | 5.6 |
| PUD-1 | 34 | 1.8 | IPDI | 21.5 | Polyol-8 | 43.6 | BGDA | 7.82 |
| PUD-2 | 29.4 | 0.8 | TMDI | 20.3 | Polyol-8 | 52.2 | BGDA | 13.6 |
| PUD-3 | 27.9 | 0.7 | H12MDI | 24.1 | Polyol-8 | 49.7 | BGDA | 13 |
| PUD-4 | 29 | 0.8 | IPDI | 21.2 | Polyol-8 | 51.6 | BGDA | 13.5 |
| PUD-5 | 35.7 | 0.8 | IPDI | 22.6 | Polyol-9 | 45.8 | BGDA | 16.4 |
| PUD-6 | 39.9 | 0.9 | IPDI | 25.3 | Polyol-8 | 41 | BGDA | 16.1 |
| PUD-7 | 28.5 | 0.9 | IPDI | 20.8 | Polyol-8 | 50.6 | BGDA | 13.2 |
| PUD-8 | 30.6 | 0.8 | IPDI | 22.3 | Polyol-9 | 45.3 | BGDA | 20.3 |
| PUD-9 | 31.1 | 0.6 | IPDI | 21.1 | Polyol-8 | 51.3 | BGDA | 15.3 |
| PUD-10 | 40.7 | 0.8 | IPDI | 24.2 | Polyol-8 | 49 | BGDA | 15.4 |
| PUD-11 | 40 | 1.0 | IPDI | 25.3 | Polyol-8 | 43.1 | BGDA | 20.2 |
| PUD-12 | 42 | 1.1 | IPDI | 26.6 | Polyol-8 | 38.8 | BGDA | 22.7 |
| PUD-13 | 39.2 | 1.2 | IPDI | 24.9 | Polyol-8 | 42.4 | BGDA | 19.9 |
| PUD-14 | 38.6 | 1.4 | IPDI | 24.5 | Polyol-8 | 41.7 | BGDA | 19.6 |
| PUD-15 | 29 | 0.8 | IPDI | 21.2 | Polyol-14 | 51.6 | BGDA | 13.5 |
| PUD-16 | 29 | 0.8 | IPDI | 21.2 | Polyol-14 | 51.6 | BGDA | 13.5 |
| PUD-17 | 28 | 0.7 | IPDI | 20.5 | Polyol-14 | 49.8 | BGDA | 13 |
| PUD-18 | 35.5 | 0.7 | IPDI | 21.1 | Polyol-14 | 51.3 | BGDA | 13.4 |
| PUD-19 | 42.1 | 0.6 | IPDI | 21.1 | Polyol-14 | 51.3 | BGDA | 13.4 |
| PUD-20 | 32.8 | 1.2 | IPDI | 25.9 | Polyol-14 | 42.1 | BGDA | 8.5 |
| PUD-21 | 30.2 | 1.9 | IPDI | 23.9 | Polyol-14 | 38.8 | BGDA | 7.82 |
| PUD-22 | 29 | 0.8 | IPDI | 21.2 | Polyol-16 | 51.6 | BGDA | 13.5 |
| PUD-23 | 35.5 | 0.7 | IPDI | 21.1 | Polyol-17 | 51.3 | BGDA | 13.4 |
| PUD-24 | 29 | 0.8 | IPDI | 21.2 | Polyol-18 | 51.6 | BGDA | 13.5 |
| PUD-25 | 30.2 | 1.9 | IPDI | 23.9 | Polyol-19 | 38.8 | BGDA | 7.82 |
| PUD-26 | 39.8 | 0.4 | IPDI | 25.9 | Polyol-14 | 50.4 | BGDA | 10.8 |
| PUD-27 | 40.1 | 0.5 | IPDI | 26.1 | Polyol-14 | 50.8 | BGDA | 10.9 |
| PUD-28 | 41.1 | 0.2 | IPDI | 24.4 | Polyol-14 | 51.4 | BGDA | 5.3 |

TABLE 2-continued

| ID | Group (c) Monomer 2 | Group (c) % Monomer 2 | Group (d) DMPA | Group (e) M2070 | Group (e) N-120 | Group (f) Taurine | Group (f) EPS |
|---|---|---|---|---|---|---|---|
| CPUD-1 | PETA | 37.8 | 2.22 | 11.0 | | | |
| CPUD-2 | AHPMA | 26.5 | | 5.50 | | 6.88 | |
| CPUD-3 | | | 7.35 | 0 | | | |
| CPUD-4 | HEA | 10.23 | 7.38 | 0 | | | |
| CPUD-5 | HEA | 9.15 | 7.04 | 5.25 | | | |
| CPUD-6 | | | 7.66 | | | | |
| PUD-1 | PETA | 14.4 | 1.62 | 4.84 | | 6.06 | |
| PUD-2 | HEA | 2.34 | 1.62 | 4.83 | | 5.04 | |
| PUD-3 | HEA | 2.22 | 1.54 | 4.6 | | 4.79 | |
| PUD-4 | HEA | 2.31 | 1.60 | 4.77 | | 4.98 | |
| PUD-5 | HEA | 1.97 | 1.70 | 5.08 | | 6.36 | |
| PUD-6 | HEA | 2.75 | 3.18 | 5.69 | | 5.94 | |
| PUD-7 | AHPMA | 4.18 | 1.57 | 4.68 | | 4.88 | |
| PUD-8 | | | 2.80 | 5.02 | | 4.2 | |
| PUD-9 | | | 3.18 | 5.06 | | 3.96 | |
| PUD-10 | HEA | 2.1 | 2.43 | | | 6.81 | |
| PUD-11 | HEA | 2.2 | 1.91 | | | 7.13 | |
| PUD-12 | HEA | 2.31 | 2.00 | | | 7.49 | |
| PUD-13 | AHPMA | 4 | 1.88 | | | 7 | |
| PUD-14 | PETA | 5.48 | 1.85 | | | 6.89 | |
| PUD-15 | HEA | 2.31 | 1.60 | 4.77 | | 4.98 | |
| PUD-16 | AHPMA | 2.31 | 1.60 | 4.77 | | 4.77 | |
| PUD-17 | PETA | 5.72 | 1.55 | 4.61 | | 4.81 | |
| PUD-18 | HEA | 1.38 | 1.59 | 4.75 | | 6.44 | |
| PUD-19 | | | 1.59 | 4.74 | | 7.91 | |
| PUD-20 | HEA | 10.2 | 1.31 | 5.84 | | 6.09 | |
| PUD-21 | AHPMA | 17.3 | 1.20 | 5.38 | | 5.61 | |
| PUD-22 | HEA | 2.31 | 1.60 | 4.77 | | 4.98 | |
| PUD-23 | HEA | 1.38 | 1.59 | 4.75 | | 6.44 | |
| PUD-24 | HEA | 2.31 | 1.60 | 4.77 | | 4.98 | |
| PUD-25 | AHPMA | 17.3 | 1.20 | 5.38 | | 5.61 | |
| PUD-26 | | | | | | | 12.9 |
| PUD-27 | | | 2.63 | | | | 9.46 |
| PUD-28 | | | | | 5.5 | | 13.3 |

* CPUD-1 through C-PUD-6 are comparative radiation curable polyurethane binders

Example 2

Example and comparative ink compositions were prepared with a black pigment or a cyan pigment (each of which is present in a dispersion with water) and with the example and comparative polyurethane binder dispersions listed in Table 2 of Example 1. The general formulation of the example and comparative ink compositions including the black pigment is shown in Table 3. The general formulation of the example and comparative ink compositions including the cyan pigment is shown in Table 4. It is to be understood that each ink includes a different one of the polyurethane binder dispersions listed in Table 2. The example and comparative inks are prepared by adding the respective binder dispersion and the black pigment dispersion or the cyan pigment dispersion to the remaining ink components shown in Tables 3 and 4.

TABLE 3

| Ingredient | Specific component | wt % active |
|---|---|---|
| Polyurethane dispersion | polyurethane binder dispersion from TABLE 2 | 5.00 |
| Co-solvent | 1-(2-hydroxyethyl)-2-pyrrolidone | 10.00 |
| Anti-Kogation agent | CRODAFOS ® N3A | 0.50 |
| Surfactant | CARBOWET ® GA-211 (formerly known as SURFYNOL ® CT-211) | 0.80 |
| Sensitizer | ethoxylated thioxanthone | 0.25 |
| Additive | LEG-1 | 1.00 |
| Photoinitiator | Dispersion of IRGACURE ® 819 | 0.25 |
| Colorant | Black pigment | 2.75 |
| Water | | Balance |

TABLE 4

| Ingredient | Specific component | wt % active |
|---|---|---|
| Polyurethane dispersion | polyurethane binder dispersion from TABLE 2 | 5.00 |
| Co-solvent | 1-(2-hydroxyethyl)-2-pyrrolidone | 10.00 |
| Anti-Kogation agent | CRODAFOS ® N3A | 0.50 |
| Surfactant | CARBOWET ® GA-211 (formerly known as SURFYNOL ® CT-211) | 0.80 |
| Sensitizer | ethoxylated thioxanthone | 0.25 |
| Additive | LEG-1 | 1.00 |
| Photoinitiator | Dispersion of IRGACURE ® 819 | 0.1 |
| Colorant | Cyan pigment | 2.50 |
| Water | | Balance |

A pre-treatment fixer fluid is also prepared. The composition of the pre-treatment fixing fluid is shown below in Table 5.

TABLE 5

| Compositional Components | wt % |
|---|---|
| Calcium Propionate | 6.5 |
| Calcium Pantothenate | 4.8 |
| Tetraethylene Glycol | 12 |
| CARBOWET ® GA-211 (formerly known as SURFYNOL ® CT-211) | 0.1 |
| Biocide (Proxel GXL) | 0.1 |
| Methanesulfonic acid | Used to Adjust pH to 6.6 |
| Deionized Water | Balance |

After each example and comparative ink composition was prepared, the decap was tested for each ink composition.

Decap testing was performed on a testbed that includes print cartridge electronics to print thermal inkjet pens with a nominal drop weight of 6 ng. These pens are printed on a standard office paper media loaded on a rotating drum (30 inches per second) with a pen frequency of 12 KHz and pen temp of 55° C. Pens are printed at discreet and increasing time intervals of up to 10 seconds. Between each print time interval, the pen is kept idle and uncapped. Decap at 1 second is reported as # of spits (drops) required to attain a healthy (drop wt and location) normal drop on the medium. The decap results were evaluated and compared to the control black ink (having no comparative or example PUD therein), and are reflected in the column labelled "Decap" in Table 6 below.

In general, during printing idle time, water evaporation from ink at the print head opening leads to significant viscosity increase close to the print head nozzles, which can form a viscous plug that prevents or interferes with the jetting of subsequent ink drops. The radiation curable polyurethane binder disclosed herein (including component b) contributes to the ink having a lower viscosity build up. As such, the ink is prevented from becoming too viscous near the nozzles between the uncapped time intervals, thereby preventing clogging of the pen opening. Thus, decap is improved and the print cartridge requires fewer drops to attain a normal, accurate drop on the medium. Specifically, these results indicate that component (b) (i.e., the polyol with two hydroxyl groups on one end of the polyol chain and no hydroxyl groups at the opposed end of the chain) unexpectedly contributes to the ink having a lower viscosity build up, and can significantly improve decap when compared to a polyol with a hydroxyl group on each end of the polyol.

The sulfonate or sulfonic acid having one or two amino functional groups (i.e., component (f)) may improve the compatibility of the ink with the pre-treatment fixing fluid, and thus improve the film formation on the medium. As a result, these example polyurethane dispersions are also expected to improve the printing performance. As such, in addition to improving decap performance of inks, some examples of the polyurethane binder dispersion disclosed herein also improve print quality attributes. Prints were formed using the black example inks (i.e., the black inks including PUD-1 through PUD-28) and the black comparative example inks (i.e., the black inks including CPUD-1 through CPUD-6). These prints were formed by first printing the pre-treatment fixing fluid (2.5 g/m² (gsm)) onto STERLING® Ultra Gloss (NewPage Corp.) media (abbreviated as "SUG" in Table 6 below). Each example and comparative ink composition was then printed onto the media containing the pre-treatment fixing fluid in an amount of about 10 gsm. The prints were then dried for 5 seconds at 375° F. (190° C.) and irradiated with UV light. The UV lamp used was a 16 W LED (light emitting diode) UV at a wavelength of 395 nm. The sample travels at a speed of 100 feet per minute (fpm) under the UV lamp at a 2 mm distance from the lamp.

Optical density (OD) and 75° gloss measurements were taken of the printed images. The optical density (OD) measurements are taken using an X-rite eXact™ densitometer and 75° gloss measurements are taken using a BYK-Gardner MICRO-GLOSS® 75° Meter (BYK-Gardner USA). The results of the optical density (OD) and 75° gloss measurements were evaluated and compared to the control black ink (having no comparative or example PUD therein), and are reflected in the columns labelled "OD" and "75 Gloss" in Table 6 below. The print quality evaluations are shown for the black example and comparative example inks, but the inks are identified in Table 6 according to the radiation curable polyurethane dispersion in the ink. Turn-on-energy (TOE) refers to the amount of power which is applied to a resistor in a printhead to vaporize part of the ink in the printhead, thereby creating a bubble of gas in the printhead. The gas expands, forcing an ink droplet out of the printhead. If the energy placed into the resistor is not sufficient to vaporize the ink, no gas bubble will form and no ink will be ejected. The minimum turn-on-energy is defined as the minimum amount of energy necessary to cause a droplet of ink to eject from a printhead. At a low TOE, there will be no ejection of ink. Once a minimum TOE level is reached, ink droplets will be formed and ejected from the printhead. TOE levels may be increased above the minimum TOE level, and as TOE increases, ink droplets will be ejected from the printhead with more velocity. The TOE results were evaluated and compared to the control black ink (having no comparative or example PUD therein), and are reflected in the column labelled "TOE" in Table 6 below. The deceleration (referred to as "Decel" in Table 6 below) of the example and comparative black inks refers to the decrease in drop velocity shortly after the nozzle starts jetting. Decel was measured using an optical drop velocity tester with 5 seconds' firing of ink drops at 1 kHz, 1 second pause, and then another 5 seconds' firing. The drop velocity (DV) "spike" or "quick drop" in DV due to such firing-pause-refiring sequence was used to quantify "decel". In an ink exhibiting good decel, there is minimum or no drop velocity change.

The results of the deceleration testing for inks including CPUD-1 through CPUD-6 and PUD-1 through PUD-28 are reflected in the "DV" column in Table 6 below.

The durability of the inks including CPUD-1 through CPUD-6 and PUD-1 through PUD-28 was evaluated with a wet rub test. The wet rub test was done in the following manner. A camel hair brush was used to brush off residue/impurities from the print, as well as from a glass backing, before initiating the wet rub.

A Taber 5700 Linear Abraser (TMI, Inc.) (with a Crockmeter Attachment) was used. The crockmeter test probe covered with a cotton cloth was dipped in 1.0 mL of water. The tester then waited for 5 seconds, and then mounted the test probe on the Taber 5700 Linear Abraser. The wet test probe was rubbed against the print surface on the glass backing without weight for 1 cycle. Then the damage on the print was visually graded. The results of the wet rub tests are reflected in the "wet rub" column in Table 6 below. The results demonstrate comparable performance of the inks containing PUD-1 through PUD-28 as compared to the inks containing CPUD-1 through CPUD-6.

In Table 6 below, the reliability, Image Quality (IQ) and durability of black inks containing a comparative (CPUD-1 through CPUD-6) or example (PUD-1 through PUD-28) radiation curable polyurethane dispersion were tested (per the test methods described above), evaluated, and compared to a control black ink (ID="None") containing no PUD. The inks are identified (column "ID") in Table 6 according to the radiation curable polyurethane dispersion (or "None" for the control) in the ink. The results of the comparison to the control were assigned a ranking according to the following scale:

| -- | - | + | ++ | +++ |
| --- | --- | --- | --- | --- | where -- is the lowest ranking, and +++ is the highest ranking; and where the higher the ranking, the better the respective property was as compared to the control black ink.

TABLE 6

| | | Reliability | | | Image Quality | | |
|---|---|---|---|---|---|---|---|
| | | | | | OD | 75 Gloss | Durability Wet rub |
| ID | Decap | TOE | DV | Decel | (SUG) | (SUG) | (SUG) |
| None | + | + | + | + | -- | -- | -- |
| CPUD-1 | -- | - | - | - | + | + | ++ |
| CPUD-2 | -- | - | - | - | ++ | ++ | ++ |
| CPUD-3 | ++ | + | + | + | -- | -- | ++ |
| CPUD-4 | ++ | + | + | + | -- | -- | ++ |
| CPUD-5 | ++ | + | + | + | -- | -- | ++ |
| CPUD-6 | ++ | + | + | + | -- | -- | ++ |
| PUD-1 | ++ | + | + | + | +++ | ++ | ++ |
| PUD-2 | ++ | + | + | + | ++ | ++ | ++ |
| PUD-3 | + | + | + | + | ++ | ++ | ++ |
| PUD-4 | ++ | + | + | + | +++ | ++ | ++ |
| PUD-5 | ++ | + | + | + | +++ | ++ | ++ |
| PUD-6 | ++ | + | + | + | ++ | ++ | ++ |
| PUD-7 | ++ | + | - | - | ++ | ++ | ++ |
| PUD-8 | ++ | + | + | + | ++ | ++ | ++ |
| PUD-9 | +++ | + | + | + | ++ | ++ | ++ |
| PUD-10 | ++ | + | ++ | + | ++ | ++ | ++ |
| PUD-11 | ++ | + | + | + | ++ | ++ | ++ |
| PUD-12 | ++ | + | + | + | ++ | ++ | ++ |
| PUD-13 | ++ | + | + | + | ++ | ++ | ++ |
| PUD-14 | ++ | ++ | ++ | ++ | + | + | ++ |
| PUD-15 | ++ | + | + | + | ++ | ++ | ++ |
| PUD-16 | ++ | + | + | + | ++ | ++ | ++ |
| PUD-17 | ++ | + | + | + | ++ | ++ | ++ |
| PUD-18 | ++ | + | + | + | ++ | ++ | ++ |
| PUD-19 | +++ | ++ | +++ | +++ | +++ | +++ | ++ |
| PUD-20 | ++ | + | + | + | ++ | ++ | ++ |
| PUD-21 | ++ | + | ++ | + | ++ | ++ | ++ |
| PUD-22 | ++ | + | + | + | ++ | ++ | ++ |
| PUD-23 | ++ | + | + | + | ++ | ++ | ++ |
| PUD-24 | ++ | + | + | + | ++ | ++ | ++ |
| PUD-25 | ++ | + | + | + | ++ | ++ | ++ |
| PUD-26 | ++ | + | + | + | + | + | ++ |
| PUD-27 | ++ | + | + | + | + | + | ++ |
| PUD-28 | ++ | + | + | + | + | + | ++ |

As can be seen in Table 6, black inks containing the example UV curable PUDs (PUD-1 to PUD-28) exhibit better decap, TOE, DV, and decel than the comparative black inks containing PUDs without example Polyols (i.e., CPUD-1 and CPUD-2).

It can also be seen in Table 6 that black inks containing the example UV curable PUDs (PUD-1 to PUD-28) exhibit better image quality (gloss and optical density) on coated offset paper (SUG) than the comparative black inks containing PUDs without component (f) (i.e., CPUD-3, CPUD-4, CPUD-5 and CPUD-6).

It is to be understood that the ranges provided herein include the stated range and any value or sub-range within the stated range. For example, a range from greater than 1 wt % to about 20 wt % should be interpreted to include not only the explicitly recited limits of greater than 1 wt % to about 20 wt %, but also to include individual values, such as 1.5 wt %, 10 wt %, 12.5 wt %, 15 wt %, etc., and sub-ranges, such as from about 12 wt % to about 18 wt %, from about 5 wt % to about 7 wt %, etc. Furthermore, when "about" is utilized to describe a value, this is meant to encompass minor variations (up to +/−10%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A radiation curable polyurethane-based binder dispersion, comprising:
   water; and
   a radiation curable polyurethane dispersed in the water, the polyurethane having been formed from:
      a polyisocyanate;
      a polyol having a chain with two hydroxyl functional groups at one end of the chain and no hydroxyl groups at an opposed end of the chain, and having a number average molecular weight ranging from about 500 to about 5,000;
      an acrylate or methacrylate, the acrylate or methacrylate having at least one hydroxyl functional group and having an acrylate functional group or a methacrylate functional group;
      an alcohol or a diol or an amine having a number average molecular weight less than 600; and
      a sulfonate or sulfonic acid having one or two amino functional groups.

2. The radiation curable polyurethane-based binder dispersion as defined in claim 1, the radiation curable polyurethane having further been formed from:
   i) a carboxylic acid having two or more hydroxyl functional groups; or
   ii) a homopolymer or copolymer of poly(ethylene glycol) having one or two hydroxyl functional groups or one or two amino functional groups at one end of its chain; or
   iii) a combination of i and ii.

3. The radiation curable polyurethane-based binder dispersion as defined in claim 1 wherein the sulfonate or sulfonic acid is selected from the group consisting of taurine, 4-aminotoluene-3-sulfonic acid, aniline-2-sulfonic acid, sulfanilic acid, 4-amino-1-naphthalenesulfonic acid, 3-amino-4-hydroxybenzenesulfonic acid, 2-amino-1-naphthalenesulfonic acid, 5-amino-2-methoxybenzenesulfonic acid, 2-(cyclohexylamino)ethanesulfonic acid, 3-amino-1-propanesulfonic acid, 2-2-(aminoethyl)aminoethanesulfonic acid, 3-2-(aminoethyl)aminopropanesulfonic acid, N,N-Bis(2-hydroxyethyl)taurine, 4-(2-hydroxyethyl)piperazine-1-ethanesulfonic acid, and N-(2-acetamido)-2-aminoethanesulfonic acid.

4. The radiation curable polyurethane-based binder dispersion as defined in claim 1 wherein:
   the polyol is formed from a free radical polymerization of a monomer in the presence of a mercaptan including two hydroxyl functional groups or two carboxylic functional groups;
   the monomer is selected from the group consisting of an alkylester of acrylic acid, an alkylester of methacrylic acid, an acid group containing monomer, acrylamide, an acrylamide derivative, methacrylamide, a methacrylamide derivative, styrene, a styrene derivative, acrylonitrile, vinylidene chloride, a fluorine containing acrylate, a fluorine containing methacrylate, a siloxane containing acrylate, a siloxane containing methacrylate, vinyl acetate, N-vinylpyrrolidone, and combinations thereof; and the mercaptan is selected from the group consisting of thioglycerol, 1-mercapto-1,1-ethanediol, 2-mercapto-1,3-propanediol, 2-mercapto-2-methyl-1,3-propanediol, 2-mercapto-2-ethyl-1,3-propanediol, 1-mercapto-2,3-propanediol, 2-mercaptoethyl-2-methyl-1,3-propanediol, and thioglycolic acid.

5. The radiation curable polyurethane-based binder dispersion as defined in claim 4 wherein:

the alkylester of acrylic acid or the alkylester of methacrylic acid is selected from the group consisting of methyl (meth)acrylate, ethyl (meth)acrylate, n-butyl (meth)acrylate, tetrahydrofuryl (meth)acrylate, trifluoroethyl (meth)acrylate, t-butyl (meth)acrylate, t-butyl acrylate, n-butyl acrylate 2-ethylhexyl (meth)acrylate, 2-ethylhexyl acrylate, hexyl (meth)acrylate, cyclohexyl (meth)acrylate, phenyl (meth)acrylate, benzyl (meth) acrylate, allyl (meth)acrylate, isobornyl (meth)acrylate, isobornyl acrylate, polyester (meth)acrylate, polycarbonate (meth)acrylate, 2-aziridinylethyl (meth)acrylate, aminomethyl acrylate, aminoethyl acrylate, aminopropyl (meth)acrylate, amino-n-butyl(meth) acrylate, N,N-dimethylaminoethyl(meth)acrylate, N,N-dimethylaminopropyl (meth)acrylate, N,N-diethylaminoethyl (meth)acrylate, and N,N-diethylaminopropyl (meth)acrylate; or the acid group containing monomer is selected from the group consisting of acrylic acid, methacrylic acid, carboxyethyl (meth)acrylate, 2-(meth)acryloyl propionic acid, crotonic acid, and itaconic acid; or the acrylamide derivative or the methacrylamide derivative is selected from the group consisting of hydroxyethylacrylamide, N,N-methylol(meth)acrylamide, N-butoxymethyl (meth)acrylamide, diacetone acrylamide, and N-isobutoxymethyl (meth)acrylamide; or the styrene derivative is selected from the group consisting of alpha-methyl styrene, p-aminostyrene, and 2-vinylpyridine.

6. The radiation curable polyurethane-based binder dispersion as defined in claim 4 wherein one of:

the monomer includes methyl methacrylate and n-butyl acrylate in a ratio of 1:1 and the mercaptan includes 10 wt % thioglycerol;

the monomer includes methyl methacrylate and 2-ethylhexyl acrylate in a ratio of 3:1 and the mercaptan includes 5 wt % thioglycerol;

the monomer includes methyl methacrylate and 2-ethylhexyl acrylate in a ratio of 1:1 and the mercaptan includes 5 wt % thioglycerol;

the monomer includes methyl methacrylate and 2-ethylhexyl acrylate in a ratio of 9:1 and the mercaptan includes 5 wt % thioglycerol;

the monomer includes methyl methacrylate, 2-ethylhexyl acrylate, and methacrylic acid in a ratio of 5:4:1 and the mercaptan includes 5 wt % thioglycerol;

the monomer includes allyl methacrylate and 2-ethylhexyl acrylate in a ratio of 7:3 and the mercaptan includes 5 wt % thioglycerol;

the monomer includes acrylonitrile and n-butyl acrylate in a ratio of 6:4 and the mercaptan includes 5 wt % thioglycerol;

the monomer includes benzyl methacrylate and 2-ethylhexyl acrylate in a ratio of 8:2 and the mercaptan includes 5 wt % thioglycerol;

the monomer includes cyclohexyl methacrylate and 2-ethylhexyl acrylate in a ratio of 66:34 and the mercaptan includes 5 wt % thioglycerol;

the monomer includes methyl methacrylate, 2-ethylhexyl acrylate, and diacetone acrylamide in a ratio of 50:45:5 and the mercaptan includes 5 wt % thioglycerol;

the monomer includes isobornyl acrylate, methyl methacrylate and n-butylacrylate in a ratio of 20:57:23 and the mercaptan includes 5 wt % thioglycerol;

the monomer includes isobornyl methacrylate and n-butyl acrylate in a ratio of 65:35 and the mercaptan includes 5 wt % thioglycerol;

the monomer includes cyclohexyl methacrylate and 2-ethylhexyl acrylate in a ratio of 8:2 and the mercaptan includes 5 wt % thioglycerol;

the monomer includes benzyl methacrylate and 2-ethylhexyl acrylate in a ratio of 19:1 and the mercaptan includes 5 wt % thioglycerol;

the monomer includes t-butyl acrylate and n-butyl methacrylate in a ratio of 8:2 and the mercaptan includes 5 wt % thioglycerol;

the monomer includes benzyl methacrylate, methyl methacrylate and n-butyl acrylate in a ratio of 2:6:2 and the mercaptan includes 5 wt % thioglycerol;

the monomer includes cyclohexyl methacrylate, methyl methacrylate, and n-butyl acrylate in a ratio of 20:57:23 and the mercaptan includes 5 wt % thioglycerol;

the monomer includes isobornyl acrylate, methyl methacrylate and 2-ethylhexyl acrylate in a ratio of 20:57:23 and the mercaptan includes 5 wt % thioglycerol; or the monomer includes styrene and n-butyl methacrylate in a ratio of 4:6 and the mercaptan includes 5 wt % thioglycerol.

7. The radiation curable polyurethane-based binder dispersion as defined in claim 1 wherein the acrylate or methacrylate is chosen from:

aliphatic diglycidyl compounds selected from the group consisting of 1,4-butanediol diglycidyl ether, 1,6-hexanediol diglycidyl ether, cyclohexanedimethanol diglycidyl ether, polyethylene glycol diglycidyl ether, polypropylene glycol diglycidyl ether, hydrogenated bisphenol A diglycidyl ether (BGDA or BADGE), hydrogenated bisphenol F diglycidyl ether, and 1,6-hexanediylbis[oxy(2-hydroxy-3,1-propanediyl)] bisacrylate; or aromatic diglycidyl compounds selected from the group consisting of bisphenol A diglycidyl ether, bisphenol F diglycidyl ether, ethoxylated or propoxylated equivalents of bisphenol A diglycidyl ether; ethoxylated or propoxylated equivalents of bisphenol F diglycidyl ether, diglycidyl phthalate, N,N-diglycidyl aniline, N,N-diglycidyl-4-glycidyloxyaniline, a diacrylate ester of bisphenol A diglycidyl ether (BGDA), and a dimethacrylate ester of bisphenol A diglycidyl ether (BGDM); or acrylates or methacrylates having one hydroxyl functional group selected from the group consisting of hydroxyethylacrylate (HEA), hydroxyethylmethacrylate (HEMA), hydroxybutylacrylate (HBA), hydroxybutylmethacrylate (HBMA), (3-(acryloxy)-2-hydroxypropyl methacrylate) (AHPMA), glycerol diacrylate, trimethylolpropane diacrylate, pentaerythritoltriacrylate (PETA), ditrimethylolpropane triacrylate (DTPTA), dipentaerythritol pentaacrylate (DPPA), and (poly) ethoxylated or (poly)propoxylated equivalents of glycerol diacrylate, trimethylolpropane diacrylate, PETA, DTPTA, or DPPA; or combinations thereof.

8. The radiation curable polyurethane-based binder dispersion as defined in claim 2 wherein the carboxylic acid having two or more hydroxyl functional groups is selected from the group consisting of dimethylol propionic acid (DMPA), dimethylol butanoic acid (DMBA), alanine, citric acid, tartaric acid, glycolic acid, lactic acid, malic acid, dihydroxymaleic acid, dihydroxytartaric acid, and mixtures thereof.

9. The radiation curable polyurethane-based binder dispersion as defined in claim 8 wherein the homopolymer or copolymer of poly(ethylene glycol) has a number average molecular weight (Mn) ranging from about 500 to about 3000 and a water solubility greater than 30% v/v, and wherein the homopolymer or copolymer of poly(ethylene glycol) is one of:
 a poly(ethylene glycol) copolymer selected from the group consisting of a copolymer of poly(ethylene) and poly(ethylene glycol) with the one hydroxyl functional group, a copolymer of poly(propylene glycol) and poly(ethylene glycol) with the one hydroxyl functional group, and a copolymer of poly(ethylene glycol) and poly(propylene glycol) with the one amino functional group; or
 a poly(ethylene glycol) homopolymer selected from the group consisting of monoamine terminated poly(ethylene glycol), poly(ethylene glycol) monoethyl ether, poly(ethylene glycol) monopropyl ether, poly(ethylene glycol) monobutyl ether, poly(ethylene glycol) monomethyl ether, and two hydroxyl terminated at one end poly(ethylene glycol).

10. The radiation curable polyurethane-based binder dispersion as defined in claim 2 wherein:
 the polyisocyanate is present in an amount ranging from about 20 wt % to about 50 wt % based on a total wt % of the radiation curable polyurethane;
 the polyol having the chain with two hydroxyl functional groups at the one end of the chain and no hydroxyl groups at the opposed end of the chain is present in an amount ranging from about 10 wt % to about 70 wt % based on the total wt % of the radiation curable polyurethane;
 the acrylate or methacrylate having the at least two hydroxyl functional groups and having the acrylate functional group or the methacrylate functional group is present in an amount ranging from about 5 wt % to about 40 wt % based on the total wt % of the radiation curable polyurethane;
 the alcohol or diol or amine having the number average molecular weight less than 600 is present in an amount ranging from greater than 0 wt % to about 20 wt % based on the total wt % of the radiation curable polyurethane;
 the sulfonate or sulfonic acid is present in an amount ranging from about 5 wt % to about 20 wt % based on the total wt % of the radiation curable polyurethane; and when included:
  the carboxylic acid is present in an amount ranging from greater than 0 wt % to about 10 wt % based on the total wt % of the radiation curable polyurethane; and
  the homopolymer or copolymer of poly(ethylene glycol) is present in an amount ranging from greater than 0 wt % to about 20 wt % based on the total wt % of the radiation curable polyurethane.

11. The radiation curable polyurethane-based binder dispersion as defined in claim 1 wherein the alcohol or the diol or the amine having the number average molecular weight less than 600 is selected from the group consisting of 1,4-butanediol, 1,6-hexanediol, 1,4-cyclohexanediol, cyclohexane-1,4-dimethanol, Bisphenol A ethoxylate, Bisphenol A propoxylate, and polycarbonate diol.

12. An inkjet ink, comprising:
 water;
 a colorant;
 a co-solvent;
 a surfactant; and
 a radiation curable polyurethane binder, the radiation curable polyurethane binder having been formed from:
  a polyisocyanate;
  a polyol having a chain with two hydroxyl functional groups at one end of the chain and no hydroxyl groups at an opposed end of the chain and having a number average molecular weight ranging from about 500 to about 5,000;
  an acrylate or methacrylate, the acrylate or methacrylate having at least one hydroxyl functional group and having an acrylate functional group or a methacrylate functional group;
  an alcohol or a diol or an amine having a number average molecular weight less than 600; and
  a sulfonate or sulfonic acid having one or two amino functional groups.

13. The inkjet ink as defined in claim 12, the radiation curable polyurethane binder having further been formed from:
 i) a carboxylic acid having two or more hydroxyl functional groups; or
 ii) a homopolymer or copolymer of poly(ethylene glycol) having one or two hydroxyl functional groups or one or two amino functional groups at one end of its chain; or
 iii) a combination of i and ii.

14. The inkjet ink as defined in claim 12 wherein:
 the polyol is formed from a free radical polymerization of a monomer in the presence of a mercaptan including two hydroxyl functional groups or two carboxylic functional groups;
 the monomer is selected from the group consisting of an alkylester of acrylic acid, an alkylester of methacrylic acid, an acid group containing monomer, acrylamide, an acrylamide derivative, methacrylamide, a methacrylamide derivative, styrene, a styrene derivative, acrylonitrile, vinylidene chloride, a fluorine containing acrylate, a fluorine containing methacrylate, a siloxane containing acrylate, a siloxane containing methacrylate, vinyl acetate, N-vinylpyrrolidone, and combinations thereof; and
 the mercaptan is selected from the group consisting of thioglycerol, 1-mercapto-1,1-ethanediol, 2-mercapto-1,3-propanediol, 2-mercapto-2-methyl-1,3-propanediol, 2-mercapto-2-ethyl-1,3-propanediol, 1-mercapto-2,3-propanediol, 2-mercaptoethyl-2-methyl-1,3-propanediol, and thioglycolic acid.

15. An inkjet ink set, comprising:
 a pre-treatment fixing fluid, including:
  calcium propionate present in an amount ranging from greater than 4.5 to about 8.0 wt % based on a total wt % of the pre-treatment fixing fluid;
  calcium pantothenate present in an amount ranging from about 2.0 wt % to equal to or less than 15 wt % based on the total wt % of the pre-treatment fixing fluid;
  tetraethylene glycol;
  a surfactant;

an acid present in an amount sufficient to render a pH of the pre-treatment fixing fluid from about 4.0 to about 7.0; and
a balance of water; and
an inkjet ink, including:
  water;
  a colorant;
  a co-solvent;
  a surfactant; and
  a radiation curable polyurethane binder, the radiation curable polyurethane binder having been formed from:
    a polyisocyanate;
    a polyol having a chain with two hydroxyl functional groups at one end of the chain and no hydroxyl groups at an opposed end of the chain and having a number average molecular weight ranging from about 500 to about 5,000;
    an acrylate or methacrylate, the acrylate or methacrylate having at least one hydroxyl functional group and having an acrylate functional group or a methacrylate functional group;
    an alcohol or a diol or an amine having a number average molecular weight less than 600;
    a sulfonate or sulfonic acid having one or two amino functional groups; and one of:
      i) a carboxylic acid having two or more hydroxyl functional groups; or
      ii) a homopolymer or copolymer of poly(ethylene glycol) having one or two hydroxyl functional groups or one or two amino functional groups at one end of its chain; or
      iii) a combination of i and ii.

16. The radiation curable polyurethane-based binder dispersion as defined in claim 4 wherein the mercaptan makes up from about 2 wt % to about 10 wt % of the polyol, based on the total wt % of the polyol.

17. The radiation curable polyurethane-based binder dispersion as defined in claim 16 wherein the monomer makes up a remaining wt % of the polyol.

18. The inkjet ink as defined in claim 12 wherein the radiation curable polyurethane binder is present in the inkjet ink in an amount ranging from greater than 5 wt % to about 15 wt % based upon the total wt % of the inkjet ink.

* * * * *